(12) United States Patent
Kanamoto

(10) Patent No.: US 8,514,432 B2
(45) Date of Patent: Aug. 20, 2013

(54) IMAGE FORMING APPARATUS, CONTROL METHOD, AND COMPUTER-READABLE STORAGE MEDIUM

(75) Inventor: Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/424,009

(22) Filed: Apr. 15, 2009

(65) Prior Publication Data
US 2009/0262395 A1 Oct. 22, 2009

(30) Foreign Application Priority Data
Apr. 22, 2008 (JP) ................... 2008-111515

(51) Int. Cl.
G06F 3/12 (2006.01)
B41J 11/00 (2006.01)

(52) U.S. Cl.
USPC ............................ 358/1.15; 358/1.13; 400/582

(58) Field of Classification Search
USPC .................. 358/1.15, 1.13; 235/375
See application file for complete search history.

(56) References Cited

U.S. PATENT DOCUMENTS

| 5,923,013 | A | * | 7/1999 | Suzuki et al. | 235/375 |
| 2004/0105115 | A1 | * | 6/2004 | Edwards et al. | 358/1.13 |
| 2006/0044602 | A1 | * | 3/2006 | Kitahara et al. | 358/1.15 |
| 2007/0127050 | A1 | * | 6/2007 | Iwata et al. | 358/1.13 |

FOREIGN PATENT DOCUMENTS

| JP | 2001328740 A | 11/2001 |
| JP | 2004-310746 A | 11/2004 |
| JP | 2004-310747 A | 11/2004 |
| JP | 2007049339 A | 2/2007 |
| JP | 2008041001 A | 2/2008 |

* cited by examiner

Primary Examiner — Marivelisse Santiago Cordero
Assistant Examiner — Moustapha Diaby
(74) Attorney, Agent, or Firm — Canon U.S.A., Inc. IP Division

(57) ABSTRACT

With reprinting of a print job, in the case that a job ticket strictly defining the output article form is not transmitted, the output article at the time of a first printing and the output article at the time of reprinting may differ, whereby the client may not be able to obtain the desired output article. The present invention provides control to execute reprinting processing employing a setting value used for the actual printing processing.

5 Claims, 33 Drawing Sheets

FIG. 12

```
<?xml version="1.0" encoding="UTF-8"?>
<JDF xmlns="http://www.CIP4.org/JDFSchema_1_1" xmlns:xsi="http://www.w3.org/2001/XMLSchema-instance"
xmlns:cj=http://www.xxxxx.com/ns/XxxxxJDF JobID="func-033" JobPartID="11112" Category="DigitalPrinting"
ID="ICSIDP_Example1_Root" Status="Ready" Max Version="1.2" Version="1.2" ICSVersions="Base_L0-1.0 IDP_L1-1.0"
Activation="Active" DescriptiveName="DocumentTest00001" Type="Combined"
Types="LayoutPreparation Imposition Interpreting Rendering DigitalPrinting Stitching">                         } 3701
  <AuditPool>
    <Created AgentName="softname1" AgentVersion="1.11" TimeStamp="2004-12-23T10:16:00Z"/>
    <Modified AgentName="softname2" AgentVersion="2.22" TimeStamp="2005-02-05T03:01:59+03:00"/>               } 3702
  </AuditPool>
  <ResourceLinkPool>
    <RunListLink rRef="LinkRunList" Usage="Input" CombinedProcessIndex="0 1"/>
    <LayoutPreparationParamsLink rRef="LinkLayoutPreparationParams" Usage="Input" CombinedProcessIndex="0"/>
    <InterpretingParamsLink rRef="LinkInterpretingParams" Usage="Input" CombinedProcessex="2"/>                } 3703
    <RenderingParamsLink rRef="LinkRenderingParams" Usage="Input" CombinedProcessex="3"/>
    <DigitalPrintingParamsLink rRef="LinkDigitalPrintingParams" Usage="Input" CombinedProcessIndex="4"/>
    <StitchingParamsLink rRef="LinkStitchingParams" Usage="Input" CombinedProcessIndex="5"/>
    <ComponentLink rRef="LinkComponent" Usage="Output" CombinedProcessIndex="5"/>
  </ResourceLinkPool>
  <ResourcePool>
    <LayoutElement Class="Parameter" ID="LinkLayoutElement" Status="Available">
      <FileSpec Compression="None" URL="cid:0000" MimeType="application/postscript"/>
    </LayoutElement>
    <RunList Class="Parameter" ID="LinkRunList" Status="Available">
      <LayoutElementRef rRef="LinkLayoutElement"/>
    </RunList>
    <LayoutPreparationParams Class="Parameter" ID="LinkLayoutPreparationParams" Status="Available" NumberUp="2 1"
     PageDistributionScheme="Saddle" Sides="TwoSidedFlipY" cj:PageSetType="Left" SurfaceContentsBox="2 4.4 800 500.5"/>    } 3704
    <InterpretingParams Class="Parameter" ID="LinkInterpretingParams" Status="Available"/>
    <RenderingParams Class="Parameter" ID="LinkRenderingParams" Status="Available"/>
    <Media Class="Consmable" ID="LinkMedia2" Status="Available" Dimension="842 1191"/>
    <DigitalPrintingParams Class="Parameter" ID="LinkDigitalPrintingParams" Status="Available" PartIDKeys="RunIndex">
      <MediaRef rRef="LinkMedia2"/>
    </DigitalPrintingParams>
    <StitchingParams Class="Parameter" ID="LinkStitchingParams" Status="Available" StitchType="Saddle"/>
    <Component Class="Quantity" ID="LinkComponent" ComponentType="FinalProduct" Status="Unavailable"/>
  </ResourcePool>
</JDF>
```

FIG. 15

| FUNCTION | ANALYSIS RESULT |
|---|---|
| DUPLEX PRINTING | (BLANK) |
| PAGE PRINTING | NO |
| MIXED SHEETS | NO |
| MEDIA | DECK 1 |
| SHIFT STACKING | NO |
| ROTATED STACKING | NO |
| SHIFTED STACKING WITH NUMBER OF COPIES SPECIFIED | NO |
| CASE BINDING | NO |
| SADDLE STITCH BINDING | YES |
| ONE-SIDED TRIMMING PROCESSING | NO |
| THREE-SIDED TRIMMING PROCESSING | NO |
| FOLDED IN THE MIDDLE | YES |
| SADDLE STITCHING | YES |
| PUNCHING | NO |

FIG. 16

| FUNCTION | ANALYSIS RESULT |
|---|---|
| DUPLEX PRINTING | DUPLEX |
| PAGE PRINTING | NO |
| MIXED SHEETS | YES |
| MEDIA | DECK 2 |
| SHIFT STACKING | NO |
| ROTATED STACKING | NO |
| SHIFTED STACKING WITH NUMBER OF COPIES SPECIFIED | NO |
| CASE BINDING | NO |
| SADDLE STITCH BINDING | NO |
| ONE-SIDED TRIMMING PROCESSING | NO |
| THREE-SIDED TRIMMING PROCESSING | NO |
| FOLDED IN THE MIDDLE | NO |
| SADDLE STITCHING | NO |
| PUNCHING | NO |

FIG. 18

| ATTRIBUTES BEFORE CONVERSION | ATTRIBUTE VALUE | ATTRIBUTES AFTER CONVERSION | |
|---|---|---|---|
| MEDIA | AUTO | MEDIA SIZE, MEDIA TYPE | |
| MEDIA | SHEET FEED STAGE | MEDIA SIZE, MEDIA TYPE | |
| ........ | ........ | ........ | |
| ALL ATTRIBUTES | OMITTED | PANEL VALUES | |

FIG. 19

| FUNCTION | ANALYSIS RESULT |
|---|---|
| DUPLEX PRINTING | DUPLEX |
| PAGE PRINTING | NO |
| MIXED SHEETS | NO |
| MEDIA | A4, 0001 |
| SHIFT STACKING | NO |
| ROTATED STACKING | NO |
| SHIFTED STACKING WITH NUMBER OF COPIES SPECIFIED | NO |
| CASE BINDING | NO |
| SADDLE STITCH BINDING | YES |
| ONE-SIDED TRIMMING PROCESSING | NO |
| THREE-SIDED TRIMMING PROCESSING | NO |
| FOLDED IN THE MIDDLE | YES |
| SADDLE STITCHING | YES |
| PUNCHING | NO |

FIG. 20

```
<?xml version="1.0" encoding="UTF-8"?>
<JDF xmlns="http://www.CIP4.org/JDFSchema_1_1" xmlns:xsi="http://www.w3.org/2001/XMLSchema-instance"
xmlns:cj=http://www.xxxxx.com/ns/XxxxxJDF JobID="func-033" JobPartID="11112" Category="DigitalPrinting"
ID="ICSIDP_Example1Root" Status="Ready" Max Version="1.2"Version="1.2" ICSVersions="Base_L0-1.0 IDP_L1-1.0"
Activation="Active" DescriptiveName="DocumentTest00001" Type="Combined"
Types="LayoutPreparation Imposition Interpreting Rendering DigitalPrinting Stitching">

<ResourceLinkPool>
  ..
  <ResourceLinkPool>

<ResourcePool>
  ...                                          5301
  <LayoutPreparationParams Sides="">
  <Media Class="Consumable" ID="LinkMedia2" Status="Available" Location="Deck 1"/>
  <DigitalPrintingParams ID="LinkDigitalPrintingParams" Class="Parameter" Status="Available" PartIDKeys="RunIndex">
                                                                                                5302
    <MediaRef rRef="LinkMedia2"/>
  </DigitalPrintingParams>
  ...
  </ResourcePool>
</JDF>
```

FIG. 21

```
<?xml version="1.0" encoding="UTF-8"?>
<JDF xmlns="http://www.CIP4.org/JDFSchema_1_1" xmlns:xsi="http://www.w3.org/2001/XMLSchema-instance"
xmlns:cj=http://www.xxxxx.com/ns/XxxxxJDF JobID="func-033" JobPartID="11112" Category="DigitalPrinting"
ID="ICSIDP_Example1_Root" Status="Ready" Max Version="1.2" Version="1.2" ICSVersions="Base_L0-1.0 IDP_L1-1.0"
Activation="Active" DescriptiveName="DocumentTest00001" Type="Combined"
Types="LayoutPreparation Imposition Interpreting Rendering DigitalPrinting Stitching">

<ResourceLinkPool>
..
<ResourceLinkPool>

<ResourcePool>
...                                    5501
<LayoutPreparationParams Sides="TwoSidedFlipX">
<Media Class="Consumable" ID="LinkMedia2" Status="Available" Dimension=""842 595"Type="0001"/>
<DigitalPrintingParams= "Class="Parameter" ID="LinkDigitalPrintingParams"Status="Available "PartIDKeys="RunIndex">
  <MediaRef rRef="LinkMedia2"/>
</DigitalPrintingParams>
...
</ResourcePool>
</JDF>
```

| JOB ID | JDF | PDL |
|---|---|---|
| 1 | JDF1 | PDL1 |
| 2 | JDF2 | PDL2 |
| 3 | JDF3 | PDL3 |
| 4 | — | — |
| 5 | — | — |
| 6 | — | — |
| ⋮ | ⋮ | ⋮ |

8701 / 8702 / 8703

IMAGE FORMING APPARATUS, CONTROL METHOD, AND COMPUTER-READABLE STORAGE MEDIUM

BACKGROUND OF THE INVENTION

1. Field of the Invention

The present invention relates to an image forming apparatus, control method, and computer-readable storage medium storing a program to execute printing processing using a printing job.

2. Description of the Related Art

In the commercial printing industry, printing materials are issued through various types of work processes. Such processes include input of an original document, attaching a design to the original document, layout editing, comprehensive layouts, proofreading, proofing, mechanical creating, printing, post-processing process, transmitting, and so forth.

In the case of the commercial printing industry, offset reproduction printing apparatuses are often used in printing processes, whereby mechanical creating processing is an indispensable process. However, with mechanical creating, once performed, correction thereof is not readily made, and in the case of performing corrections, the cost becomes inefficient. Accordingly, with mechanical creating, careful proofreading (i.e. carefully checking layouts and confirming colors) becomes necessary. Therefore, until the issue of the output article is completed, a certain length of time has generally been required.

Also, in the case of the commercial printing industry, an apparatus used in the various work processes are mostly heavy duty and have a high cost, and since professional knowledge is required for the work with these various processes, the know-how of a so-called expert person with experience has been indispensable.

Now, in recent times, electrophotography and inkjet printing apparatuses have increased in speed and image quality, whereby a so-called POD (Print On Demand) market is emerging, competing with the commercial printing industry. The POD market has emerged instead of large-scale printing apparatuses and printing methods so as to be able to handle relatively small lot jobs in a short time period without employing a heavy duty apparatus or system. In the POD market, printing apparatuses such as digital photocopiers or digital multi-function apparatuses are maximally employed, whereby digital printing using electronic data is realized and a printing service can be performed.

In such a situation, currently office machine manufacturers have been researching entering a new direction in a new field called a POD market (Japanese Patent Laid-Open No. 2004-310746 and Japanese Patent Laid-Open No. 2004-310747). Recently in particular, research continues for printing apparatuses and printing systems, not only for the office environment for example, but also to sufficiently satisfy a POD environment that can be expected to have use cases and needs different from those in the office environment. Assuming a printing environment in such a POD market, it is expected that how the printing systems can improve productivity will be closely watched. Also, it is expected that how easily an operator of a printing system can use the printing system while maintaining high productivity, will be closely watched.

Recently, printing apparatuses for the POD market have come to be able to handle JDF (Job Definition Format). JDF is s common digital format (also called an instruction file or job ticket) relating to printing processes as a whole, for systems for the POD market defined by CIP4 (Cooperation for the Integration of Processing Prepress, Press and Postpress). JDF uses XML which is a basic Web format for the format thereof. Using this feature, advantages of management relating to overall printing processes are expected such as production management on a website, confirming operational state of various apparatuses such as printer, binder, and the like.

Strictly defining the form of the output article is strongly desired with JDF. The reason thereof is that if the output article obtained according to client instructions is not the output article according to client intent, the printing company must perform printing processing again based on the instructions and desires of the client, raising costs.

However, creating a job ticket that strictly regulates the output article form satisfying the above-described conditions of the client is actually difficult. This is because in order to perform such strict regulating, professional knowledge relating to the work processed in each process of the printing workflow is necessary, but the client generally does not have such professional knowledge.

With the POD market, reprinting may be a operation that exists, but in the case that a job ticket strictly defining the output article form is not transmitted, the output article at the time of previous printing and the output article at the time of reprinting may differ, whereby the client may be obtain the desired output article.

SUMMARY OF THE INVENTION

Embodiments of the present invention have been made in light of the above problem, and enable a client to obtain the desired output articles with reprinting as well.

In order to solve the above-described problems, embodiments of the present invention provide an image forming apparatus including: a receiving unit configured to receive a print job; an executing unit configured to execute printing processing based on the print job received by the receiving unit; and a storage unit configured to store setting values used for the printing processing with the executing unit; wherein the setting values used are not specified in the print job. The executing unit executes reprinting processing using the setting values stored with the storage unit wherein the setting value used for the reprinting processing is not specified in the print job, and is a setting value used with the executing unit.

Further features of the present invention will become apparent from the following description of exemplary embodiments (with reference to the attached drawings).

BRIEF DESCRIPTION OF THE DRAWINGS

FIG. 12 is a diagram describing a specific example of a JDF part.

FIG. 15 is a diagram describing an example of JDF analysis results.

FIG. 16 is a diagram describing an example of information stored in the table managing a default value of JDF printing attributes.

FIG. 18 is a diagram describing an example of an attribute conversion table used with the form of output article matching mode.

FIG. 19 is a diagram describing an example of a JDF analysis result table of conversion results.

FIG. 20 is a job ticket example by JDF before the form of output article matching mode is employed.

FIG. 21 is a job ticket example by JDF after the form of output article matching mode is employed.

FIG. 30 is a diagram describing a storage data example within a saved document data management table region.

DESCRIPTION OF THE EMBODIMENTS

Embodiments of the present invention will be described in detail below with reference to the appended diagrams.

Figure 1:
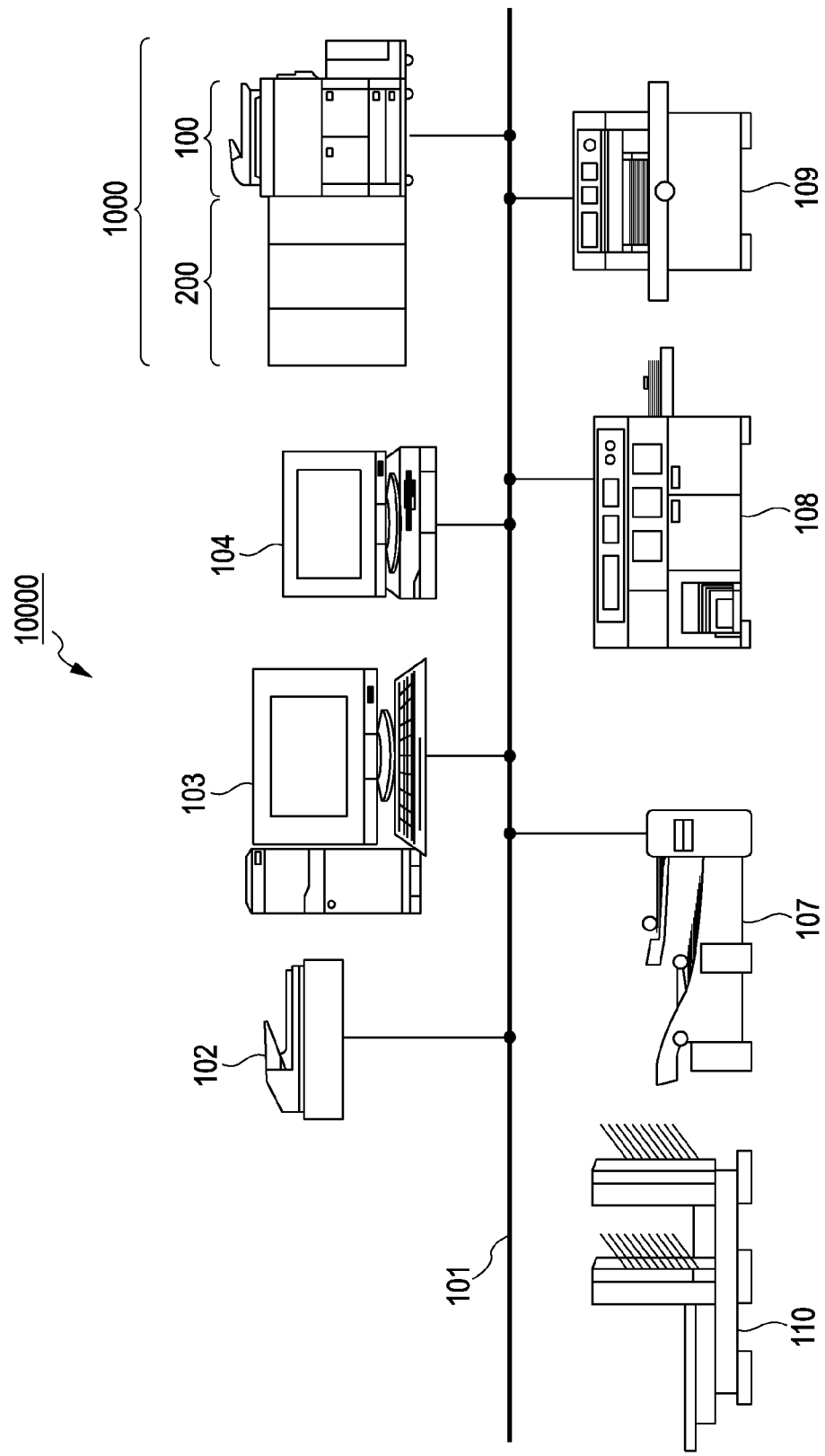
FIG. 1 is a diagram illustrating an overall configuration example of a printing environment including a printing system to be controlled according to an embodiment of the present invention.

A POD system 10000 shown in FIG. 1 has a printing system 1000, server computer 103, and a client computer 104 (hereafter called PC). Also, the POD system 10000 in FIG. 1 has a sheet-folding apparatus 107, trimming apparatus 109, saddle-stitch binding apparatus 110, case work binding apparatus 108, scanner 102, and so forth.

The system 1000 has a printing apparatus main unit 100 (also referred to simply as "printing apparatus main unit 100") and sheet processing apparatus 200. Note that with the present invention, the printing apparatus 100 is exemplified and described as a multi-function apparatus having multiple functions such as a copy function and a printing function that prints printing jobs transmitted from the PC, and the like, but a printing apparatus of a single function type may be used. Note that a multi-function apparatus is also called an MFP (Multi Function Peripheral). Note that the sheet processing apparatus 200 is an apparatus for processing output articles output from the printing apparatus 100. Also, an apparatus that forms an image such as the printing system 1000 and printing apparatus 100 is also called an image forming apparatus in the present Specification.

The sheet-folding apparatus 107, trimming apparatus 109, saddle-stitch binding apparatus 110, and case work binding apparatus 108 in FIG. 1 are defined as sheet processing apparatuses to process an output article with a printing apparatus. For example, the sheet-folding apparatus 107 executes folding processing for output articles (sheets) of a job printed with the printing apparatus 100. The trimming apparatus 109 executes trimming processing for output articles output from the printing apparatus 100. The saddle-stitch binding apparatus 110 executes saddle-stitch binding processing for output articles output from the printing apparatus 100. The case work binding apparatus 108 executes case work binding to create a book by wrapping a sheet to use as a cover of output articles output from the printing apparatus 100. However, in the case of executing various types of sheet processing with these sheet processing apparatuses, an operator needs to perform work to remove the output articles of the job printed with the printing apparatus 100 from the discharge unit of the printing apparatus 100, and set such output articles in a sheet processing apparatus for processing.

Thus, in the case of employing a sheet processing apparatus other than the sheet processing apparatus 200 provided by the printing system 1000, inserting work by the operator after printing processing is executed by the printing apparatus 100 is necessary. In other words, in the case of employing the sheet processing apparatus 200 of the printing system 1000 itself, inserting work by the operator after printing processing is executed by the printing apparatus 100 is unnecessary. This is because the sheet printed with the printing apparatus 100 can be supplied directly to the sheet processing apparatus 200 from the printing apparatus 100. Specifically, a sheet conveyance path within the printing apparatus 100 is communicated to a sheet conveyance path within the sheet processing apparatus 200. Thus, the sheet processing apparatus 200 and printing apparatus 100 of the printing system 1000 itself are physically connected. Also, the printing apparatus 100 and sheet processing apparatus 200 have a CPU, and are configured so as to be able to communicate data.

Note that with the present embodiment, the control unit of the present printing system performs overall control of the printing apparatus 100 and sheet processing apparatus 200.

Figure 2:
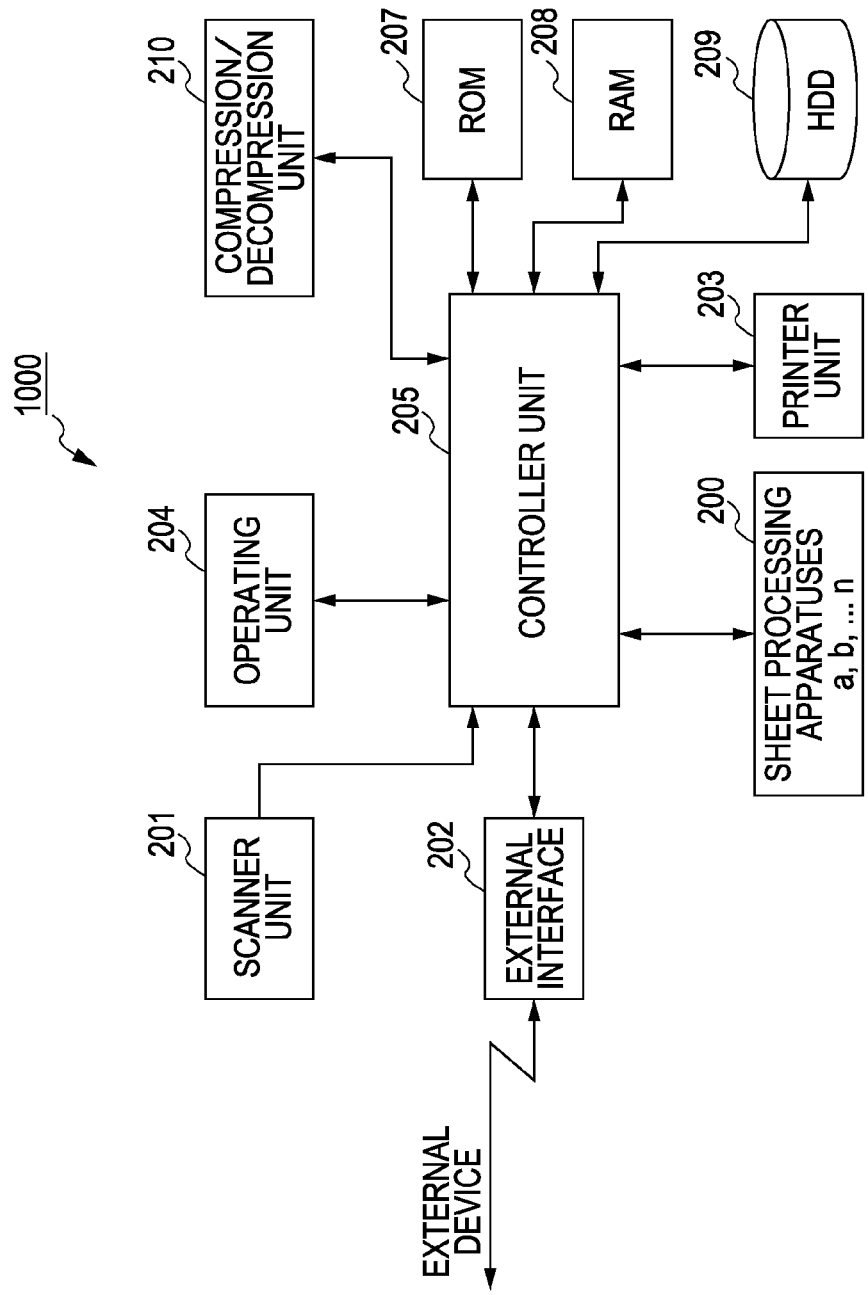
FIG. 2 is a diagram illustrating a configuration example of a printing system to be controlled according to an embodiment of the present invention.

As an example thereof, a controller unit 205 within the printing apparatus 100 in FIG. 2 performs overall control.

Note that with the POD system 10000 in FIG. 1, the apparatuses other than the saddle-stitch binding 110 are all connected to a network 101, and are configured so as to be able to communicate data mutually with other apparatuses.

The server PC 103 manages all jobs to be processed with the present POD environment 10000, by executing transmitting/receiving of data with other apparatuses using network communication. In other words, the server PC 103 functions as a computer to perform overall management of the entire series of workflow processes made up from multiple processing processes. The PC 103 determines post-processing conditions which can be finished with the present environment 10000, based on instructions for a job received from the operator. Also, the server PC 103 instructs executing of post-processing (finishing processing) processing as requested by a client. In this event, the server PC 103 employs information exchange tools such as JDF to exchange information with the sheet processing apparatus.

The above-mentioned sheet processing apparatus is defined in the present embodiment as described below, divided into three types.

Definition 1

A sheet processing apparatus which is an apparatus meeting both Condition 1 and Condition 2 below is defined as an "inline finisher". Note that an apparatus applicable to this definition is also called an inline-type sheet processing apparatus with the present embodiment.

Condition 1: A sheet path (sheet conveyance path) physically connects the inline finisher with the printing apparatus 100 so that the sheets conveyed from the printing apparatus 100 can be directly received without intervention from a user.

Condition 2: The inline finisher is electrically connected to other apparatuses so that the data communication necessary for operational instructions and status confirmation and so forth can be made with the other apparatuses. Specifically, the inline finisher is electrically connected with the printing apparatus 100 so as to enable data communication, or is electrically connected to a apparatus other than the printing apparatus 100 (e.g. PC 103, 104, or the like) via the network 101 so as to enable data communication. Condition 2 is considered to have been met by at least one of these conditions being met. That is to say, the sheet processing apparatus 200 of the printing system 1000 itself is applicable to "inline finisher"

Definition 2

A sheet processing apparatus which is applicable to an apparatus meeting Condition 2 but not meeting Condition 1 out of the above Condition 1 and Condition 2 is defined as a "near-line finisher". Note that an apparatus applicable to this definition is also called a near-line type sheet processing apparatus.

For example, a sheet processing apparatus which does not have a sheet path connected to the printing apparatus 100 and requires a worker (operator) to perform insertion work such as conveying output articles, but which operation instructions and status confirmation is electrically transmittable via a communication unit such as the network 101 or the like, is defined as a "near-line finisher". That is to say, the sheet-folding apparatus 107, trimming apparatus 109, saddle-stitch binding apparatus 110, and case work binding apparatus 108 in FIG. 1 are applicable to "near-line finisher".

Definition 3

A sheet processing apparatus which is an apparatus not meeting the conditions of either the above-mentioned Condition 1 and Condition 2 is defined as an "off-line finisher". Note that an apparatus applicable to this definition is also called an off-line type sheet processing apparatus in the present embodiment.

For example, a sheet processing apparatus which does not have a sheet path connected to the printing apparatus 100 and requires a worker (operator) to perform insertion work such as conveying printed material, and which does not have a communication unit necessary for operation instructions and status confirmation whereby data communication with other apparatuses cannot be performed, thereby requiring manual work by an operator for conveying output articles, settings for output articles, manual operation input, and status reports generated by the apparatus itself, is defined as an "off-line finisher". That is to say, the saddle-stitch binding apparatus 110 in FIG. 1 is an "off-line finisher".

A near-line finisher or off-line finisher managed by the server PC 103 also includes various apparatuses such as a stapling dedicated apparatus, hole-punch dedicated apparatus, a mail-inserting apparatus, or a collator and so forth. The server 103 can know the device status or job status using sequential polling and so forth, with a protocol determined beforehand and these near-line finishers, via the network 101.

Note that the present embodiment may have a configuration wherein the above-described multiple recording sheet processing can be executed each with separate sheet processing apparatuses, or may have a configuration wherein one sheet processing apparatus can execute multiple types of recording sheet processing.

Next, the internal configuration (primarily the software configuration) of the present printing system 1000 will be described with reference to FIG. 2. Units other than the sheet processing apparatus 200 of the various units shown in FIG. 2 of the printing system 1000 are all housed within the printing apparatus 100. In other words, the sheet processing apparatus 200 is a sheet processing apparatus that is detachable from the printing apparatus 100.

The printing apparatus 100 has a non-volatile memory such as a hard disk 209 (hereafter also called HD) which can store data of multiple jobs to be processed within the apparatus itself. Also, the printing apparatus 100 has a copy function to print image data obtained by processing of the scanner unit 201 of the printing apparatus 100 itself, with the printer unit 203 via the HD. Also, the printing apparatus 100 has a printing function and so forth to print job data received from external apparatuses such as the PC 103 and 104 via the external interface unit 202, which is an example of a communication unit, with the printer unit 203 via the HD. The printing apparatus 100 is an MFP-type printing apparatus (also called image forming apparatus) having such multiple functions. Note that the printing apparatus 100 may be configured as a color printer or monochrome printer, so long as the various types of controls described in the present embodiment can be executed.

The printing apparatus 100 has a scanner unit 201 to subject image data obtained by reading an original document image to image processing. The printing apparatus 100 also has an external interface 202 configured to exchange image data and the like with facsimile apparatuses, network-connected apparatuses, and external dedicated apparatuses. Also, the printing apparatus 100 has a hard disk 209 that can store image data of multiple jobs to be printed received from one of the scanner unit 201 and external interface unit 202. Also, the printing apparatus 100 has a printer unit 203 to print data to be printed that is stored in the hard disk 209, on a printing medium. Also, the printing apparatus 100 has an operating unit 204 (display unit) which exemplifies the user interface unit of the printing system 1000. Another example of the user interface provided in the printing system 1000 is, for example, the display units and keyboards or mice of the external apparatuses, i.e., PC 103 and 104.

The controller unit (also called control unit or CPU) 205 which exemplifies the control unit of the printing system 1000 performs overall control of the processing and operations of the various types of units of the printing system 1000. Various types of control programs, which include programs to execute various types of processing in the later-described flowcharts are stored in the ROM 207.

A display control program to display the user interface screen shown in several of the drawings (hereafter called UI screen) is also stored in the ROM 207. The control unit 205 executes various types of operations described in the present embodiment by reading the program in ROM 207. Also, the ROM 207 stores programs to interpret the printing jobs received from the external apparatus (103, 104, and so forth) and expand the raster image data (bitmap image data). This processing is performed with software.

The ROM 207 is read-only memory, and has various types of programs stored such as boot sequence and font information programs and the above-mentioned programs. The RAM 208 is readable and writable memory, and stores image data sent from the scanner unit 201 or external interface 202 via the memory controller 206 and various types of programs and setting information.

The control unit 205 controls data of jobs to be processed which are input via various types of input units such as the scanner unit 201 and external interface unit 202 so as to be printable with the printer unit 203 via the HDD 209. Also, the control unit 205 sends data to the external apparatuses via the external interface 202. Further, the control unit 205 controls the output processing as to the data for jobs to be processed which are stored in the HDD 209. The compression/decompression unit 210 performs compression/decompression operations of the image data stored in the RAM 208 and HDD 209 with various types of compression methods.

With such a configuration, the control unit 205 of the printing system also controls the operations of the inline type sheet processing apparatus 200. The mechanical configuration of the printing system 1000 to include the description herein will be described with reference to FIG. 3 and so forth.
Apparatus Configuration of System 1000 (Primarily Mechanical Configuration)

Next, the configuration (primarily the mechanical configuration) of the printing system 1000 will be described with reference to the apparatus configuration description diagram in FIG. 3. The printing system 1000 includes multiple inline type sheet processing apparatuses.

Also, the inline type sheet processing apparatuses which can be connected to the printing apparatus 100 are arranged to be set with an arbitrary number of units according to the usage environment so as to increase the effects of the present embodiment, under specified restrictions. For example in FIG. 3, starting with the first sheet processing apparatus, the sheet processing apparatuses are shown as sheet processing apparatus 200a, 200b, . . . and the N'th sheet processing apparatus is shown as the sheet processing apparatus 200n.

First, the configuration of the printing apparatus 100 will be described. Reference numeral 301 denotes the mechanical configuration of the scanner unit 201 in FIG. 2, and 302 through 322 denote the mechanical configuration of the printer unit 203 in FIG. 3. Note that with the present embodiment, the configuration of a 1D type color MFP will be described. Note that a 4D type color MFP or monochrome MFP may exemplify the printing apparatus of the present embodiment, but the description thereof is omitted here.

Figure 3:
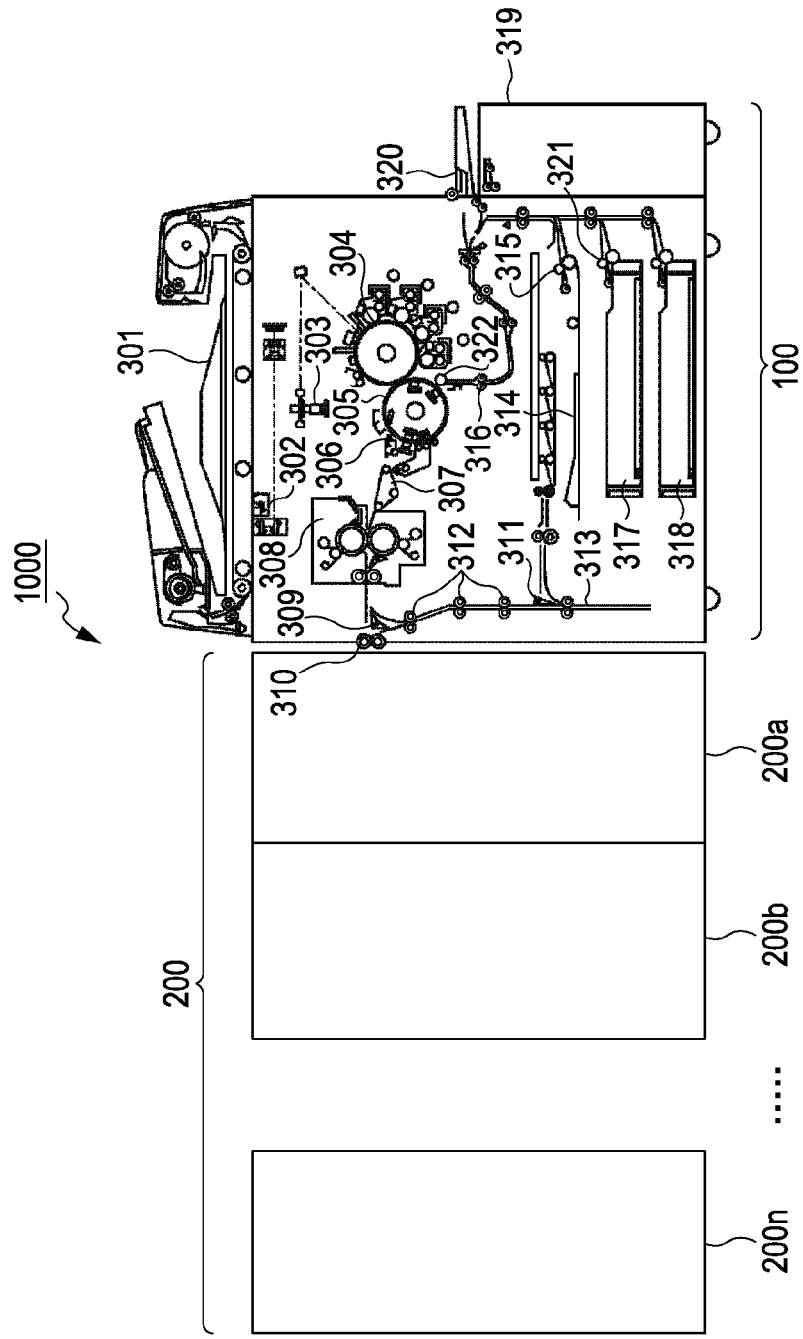
FIG. 3 is a diagram illustrating a configuration example of a printing system to be controlled according to an embodiment of the present invention.

An automatic document feeding apparatus (ADF) 301 shown in FIG. 3 conveys an original bundle set on a loading face of the document tray onto the platen glass, in page sequence starting with the first page of the document, in order to scan the original document with the scanner 302. The scanner 302 reads the image of the document conveyed onto the platen glass, and converts this to image data with a CCD. A rotation multi-face mirror (polygon mirror or the like) 303 allows incident light of a beam such as laser light which has been modulated according to the image data, and irradiates the photosensitive drum 304 as reflective scanning light via a reflective mirror. The latent image formed on the photosensitive drum 304 by the laser light is developed with toner, and the toner image is transferred onto a sheet member adhered onto the transfer drum 305. A full-color image is formed by sequentially executing this series of image forming processes as to yellow (Y), magenta (M), cyan (C), and black (K) toner. Following four image forming processes, the sheet member on the transfer drum 305 whereupon a full-color image is formed is separated by a separating claw 306, and is conveyed to a fusing unit 308 by a pre-fusing conveyer 307.

The fusing unit 308 is made up of a combination of rollers and belts, has a heat source such as a halogen heater or the like, and melts and fuses the toner on the sheet member to which the toner image is transferred with heat and pressure. A output flapper 309 is configured so as to be swingable on a swinging shaft as the center, and regulates the conveyance direction of the sheet member. When the output flapper 309 is swinging in the clockwise direction in the diagram, the sheet member is conveyed straight, and is outputted outside of the apparatus by the output roller 310. On the other hand, in the event of forming an image on both sides of the sheet member, the output flapper 309 swings in the counter-clockwise direction in the diagram, and the path of the sheet member is changed to the lower direction and is sent into a duplex conveyance unit. The duplex conveyance unit has a reverse flapper 311, reverse roller 312, reverse guide 313, and duplex tray 314.

A reverse flapper 311 is configured so as to be swingable with a swinging shaft as the center, and regulates the conveyance direction of the sheet member. In the case of processing a duplex printing job, the control unit 205 swings the reverse flapper 311 in the counter-clockwise direction in the diagram and controls the sheet subjected to printing on the first side with the printer unit 203 so as to send the sheet into the reverse guide 313 via the reverse roller 312. In the state of the sheet member trailing edge being gripped with the reverse roller 312, the reverse roller 312 is temporarily stopped, and the reverse flapper 311 then swings in the clockwise direction of the diagram. Also, the reverse roller 312 is rotated in the inverse direction. Thus, the sheet is conveyed in a switchback, and is controlled so that the sheet is led to the duplex tray 314 in a state with the trailing edge and leading edge of the sheet having been reversed.

At the duplex tray 314 the sheet members are temporarily stacked, and after this, the sheet members are sent into a register roller 316 again by a resupply roller 315. At this time the sheet members are sent with the side opposite the transfer process of the first time as the side facing the photosensitive drum. Similar to the above-described process, the second image is formed on the second side of the sheet. Thus images are formed on both sides of the sheet member, and the sheet is outputted to the outside of the printing apparatus main unit internal portion after a fusing processing via the output roller 310. The control unit 205 executes a duplex printing sequence, whereby duplex printing as to the first side and second side of the sheet with data of the job to be subjected to duplex printing is executable with the printing apparatus.

The sheet supply conveyance unit includes sheet supply cassettes 317 and 318, a sheet deck 319, and a manual feed tray 320 and so forth as a sheet supply unit to store the sheets necessary for printing processing. Also, the unit to supply the sheets stored in these sheet supply units include a sheet supply roller 321, register roller 316, and so forth.

The manual feed tray 320 is also configured so that various types of printing media including specialized sheets such as OHP sheet and so forth can be set. On the other hand, in the case that multiple sheets are taken, the extra sheet member is returned by rotating in the reverse direction from the conveyance direction so that only the uppermost one sheet is sent. The sent sheet member is guided between the conveyance guides, and is conveyed by multiple conveyance rollers to the register roller 316. At this time the register roller 316 is stopped, the leading edge of the sheet member is abutting against the nip of a register roller 316 pair, and the leading edge of the sheet member forms a loop whereby skewing is corrected. After this, the register roller 316 begins rotating to convey the sheet member, matching the timing of the toner image formed on the photosensitive drum 304 in the image forming unit. The sheet member sent by the register roller 316 is adhered to the transfer drum 305 surface by static electricity with an adhering roller 322. The sheet member outputted from the fusing unit 308 is guided to the sheet conveyance path within the sheet processing apparatus 200 via the output roller 310.

The control unit 205 executes printing processing of the printing data of the job stored in the HD 209 from the data source, based on the printing execution request received from the user via the user interface unit, with the printer unit 203 employing the method described above.

Note that, for example, a data source for a job regarding which a printing execution request is received from the operating unit 204 means a scanner unit 201. Also, the data source of the job regarding which a printing execution request is received from a host computer is naturally a host computer.

The control unit 205 stores printed data of a job to be processed in the HD 209 in sequence from the leading page, and reads the printed data of the job from the HD 209 in sequence from the leading page, and forms the image of the printing data on the sheet. Such leading page processing is performed in sequence. The control unit 205 supplies the sheets to be printed sequentially from the leading page to the sheet conveyance path within the sheet processing apparatus 200 with the image face downwards. In order to do so, the switchback operation for reversing the front and back of the sheet from the fusing unit 308 is executed employing the units 309 and 312 immediately prior to guiding the sheet to the sheet processing apparatus 200 unit with the output roller 310. Such sheet handling controls for handling leading page processing is also executed by the control unit 205.

Next, the configuration of the inline type sheet processing apparatus 200 which belongs to the printing system 1000 along with the printing apparatus 100 will be described. The system 1000 of the present embodiment in FIG. 3 has an n number of inline type sheet processing apparatuses which can be connected as a cascade to the printing apparatus 100. The number of apparatuses to be configured may be as many apparatuses as can be set. However, at the least, employing a sheet processing apparatus having a configuration that can supply the sheets subjected to printing by the printer unit 203 to the sheet processing unit within the apparatus without insertion work by an operator is required. In other words, for example, employing a sheet conveyance path (sheet path), which can convey the printing medium output from the printer unit 203 internal portion via the output roller 309 of the printing apparatus 100, is required.

However, the present invention is not limited to interpretation of such a configuration. For example, a system configuration may be used whereby the number of inline-type sheet processing apparatuses usable by the printing system 1000 and the connection order of the apparatuses thereof are uniformly regulated. At the least, if at least one of the various types of job controls to be described later is configured to be executable, such a system is included in the scope of the present invention.

Configuration of Operating Unit 204 Exemplifying User Interface Unit of System 1000

An operating unit 204 exemplifying a user interface unit (hereafter, UI unit) of the printing apparatus 100 of the system 1000 will be described with reference to FIG. 4 and other drawings. The operating unit 204 has a key input unit 402 which can receive user operations with hard keys and a touch panel unit 401 exemplifying a display unit which can receive user operations with software keys (also known as "soft keys" or "display keys").

Figure 5:
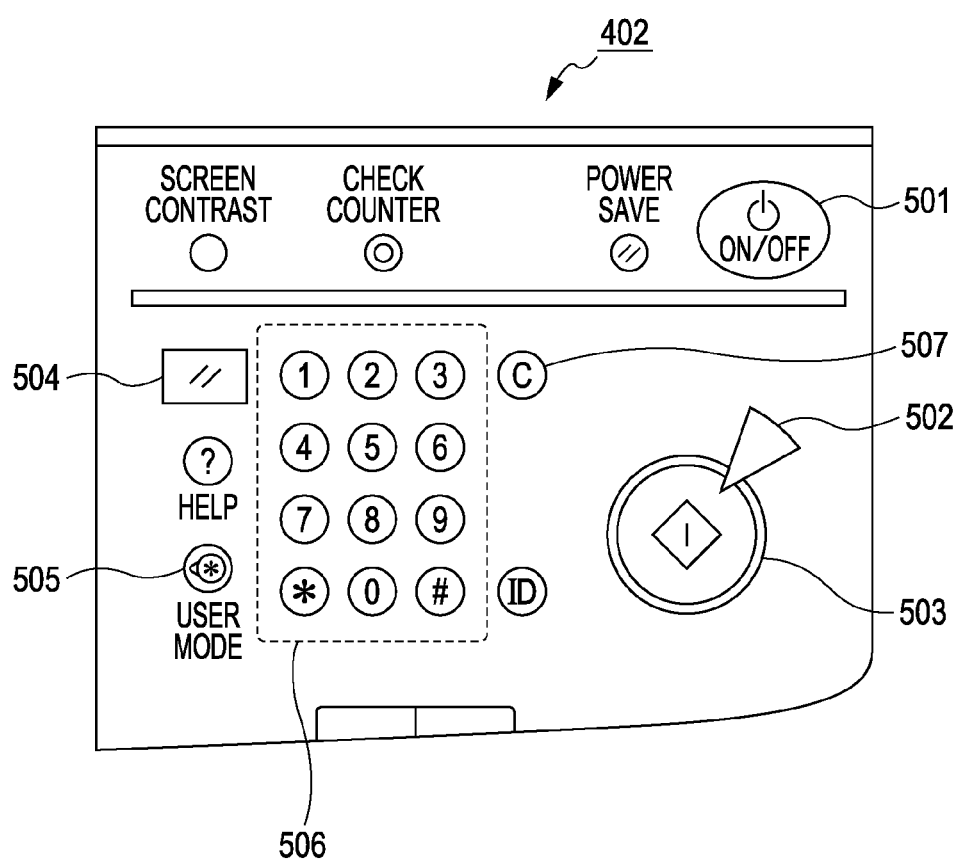
FIG. 5 is a diagram illustrating an example of a user interface unit to be controlled according to an embodiment of the present invention.

As shown in FIG. 5, the key input unit 402 has an operating unit power switch 501. The control unit 205 responds to user operation of the switch 501, and performs control so as to switch between a standby mode (normal operating state) and sleep mode (state of stopping a program in an interrupt-standby state in anticipation of network printing or facsimile or the like, and suppressing power consumption).

A start key 503 is a key for enabling the user to receive instructions to cause the printing apparatus to start the types of jobs instructed by the user, such as copying operations or sending operations for the job to be processed. A stop key 502 is a key for enabling the user to receive instructions to cause the printing apparatus to stop the processing of the received job. A numeric keypad 506 is a keypad to enable setting of setting values for various types of settings. A clear key 507 is a key to clear various types of parameters such as the setting values set by the user via the keypad 506. A reset key 504 is a key to invalidate all of the various types of setting set as to the job to be processed by the user, and to enable receiving instructions to revert the setting values to default state. A user mode key 505 is a key to move the user to a system setting screen.

Figure 6:
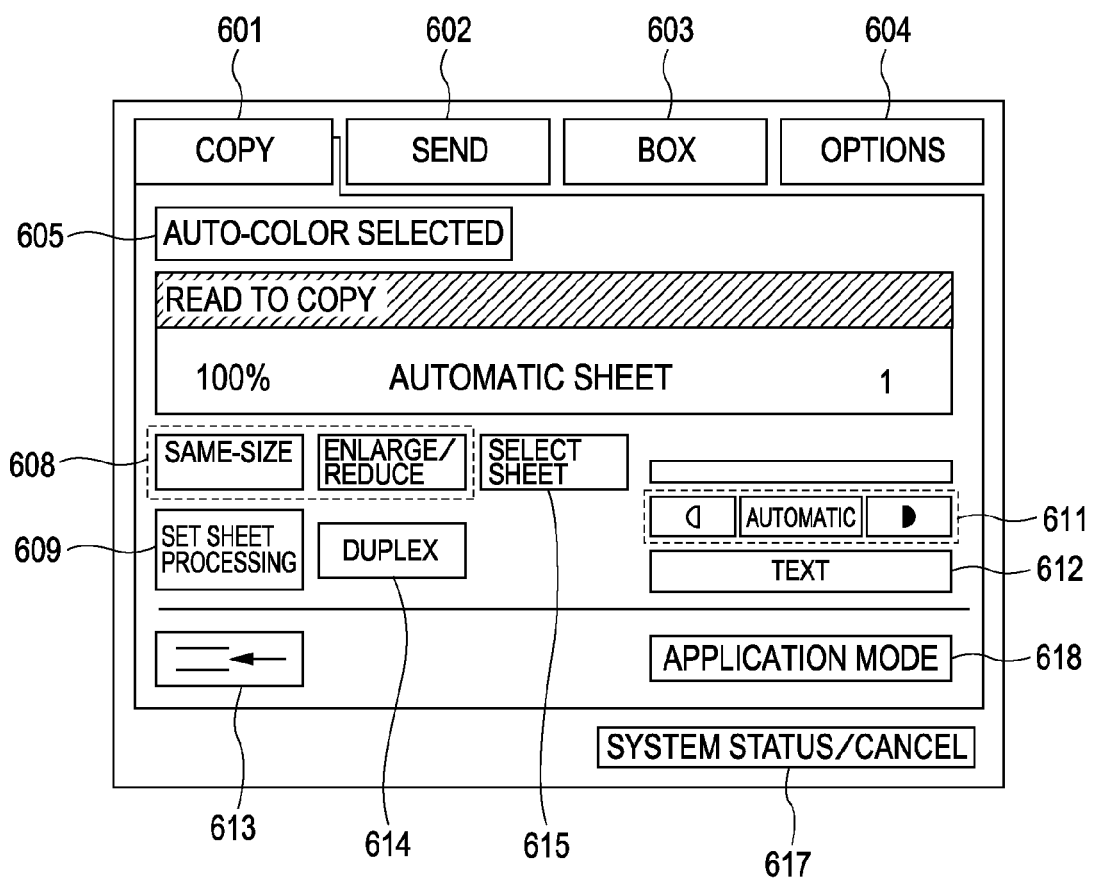
FIG. 6 is a diagram illustrating a display control example of a user interface unit to be controlled according to an embodiment of the present invention.

Next, FIG. 6 is a diagram to describe a touch panel unit (hereafter, also called display unit) which is equivalent to an example of a user interface unit provided by the printing system. The touch panel unit 401 has a touch panel display made up of a LCD (Liquid Crystal Display) and a transparent electrode pasted thereupon. The unit 401 has a function to receive various types of settings from the operator and a function to display information to the operator. For example, upon detecting that the user has pressed a location on the LCD equivalent to the display key in an effective display state, the control unit 205 follows the display control program stored beforehand in the ROM 207 to control the operating screen according to key operation so as to be displayed on the display unit 401.

In the case that a copy tab 601 on the display unit 401 shown in FIG. 6 is pressed by the user, the control unit 205 displays the operating screen for the copy function of the main printing apparatus on the display unit 401. In the case that the transmission tab 602 is pressed by the user, the control unit 205 displays the operating screen with data sending (Send) function such as fax or E-mail sending of the main printing apparatus on the display unit 401. In the case that a box tab 603 is pressed by the user, the control unit 205 displays the operating screen for the box function of the main printing apparatus on the display unit 401.

Note that a box function is a function using multiple data storage boxes (hereafter called box) provided beforehand virtually in the HDD 209. With this function, the control unit 205 performs control so as to enable the desired box of the user to be selected by the user via the user interface unit, and to enable receiving the desired operation from the user. For example, the control unit 205 responds to instructions from the user which are input via the operating unit 204, and enables the document data of the job received from the scanner 201 of the main printing apparatus to be stored in the HDD 209, as to the box selected by the user.

The control unit 205 prints the data of a job stored in the box, according to the user instructions from the operating unit 204, in an output format desired by the user, e.g. printed with the printer unit 203, and controls the external interface unit 202 so as to enable sending to the external apparatus desired by the user.

In response to the user pressing the box tab 603, the control unit 205 controls the operating screen of the box function to be displayed on the display unit 401, so as to enable the user to execute such various types of box functions. Also, in the case that an options tab 604 of the display unit 401 in FIG. 6 is pressed, the control unit 205 displays a screen to set optional functions such as scanner settings on the display unit 401. In the case that the user presses a system monitor key 617, a display screen to notify the user of the state or status of the MFP is displayed on the display unit 401.

A color selecting key 605 is a display key to enable the user to select color copying, monochrome copying, or automatic selection beforehand. A size ratio setting key 608 is a key for displaying a setting screen on the display unit 401 to enable the user to execute size ratio settings such as same-size, enlarge, and reduce.

In the case that the user presses a duplex key 614, the control unit 205 displays on the display unit 401 which of simplex printing or duplex printing to be executed with the printing processing of the job to be processed. Also, in response to the user pressing a sheet selection key 615, the control unit 205 displays a screen on the display unit 401 to enable the user to set the sheet supply unit, sheet size, and sheet type (media type). In response to the user pressing the key 612, the control unit 205 displays a screen on the display unit 401 enabling the user to select the image processing mode applicable to the document image, such as text mode or photography mode. Also, by the user operating a density setting key 611, the density of the output image of the job to be printed can be adjusted.

FIG. 6 shows a display of an operation state of an event currently occurring with the printing apparatus such as standby status, warming up, printing, jam, error, and so forth.

Further, in the case that an interrupt key 613 is pressed by the user, the control unit 205 stops the printing of the job being printed with the main printing apparatus, and enables the user to print the job. In the case that an application mode key 618 is pressed, a screen is displayed to perform settings for image processing and layouts such as continuous photo pages, cover/facing sheet settings, reduction layout, image moving and so forth.

The control unit 205 can receive instructions to execute with the inline type sheet processing apparatus 200 of the printing system 1000, as settings for a job to be processed. For example, the control unit 205 displays a display key 609 in FIG. 6 on the display unit 401. If the user presses the sheet processing setting key 609, the user selects desired sheet processing from selection options for sheet processing executable with the inline type sheet processing apparatus of the system 1000. Note that the "sheet processing setting key 609" exemplified in FIG. 6 is also called "finishing key".

Figure 7:
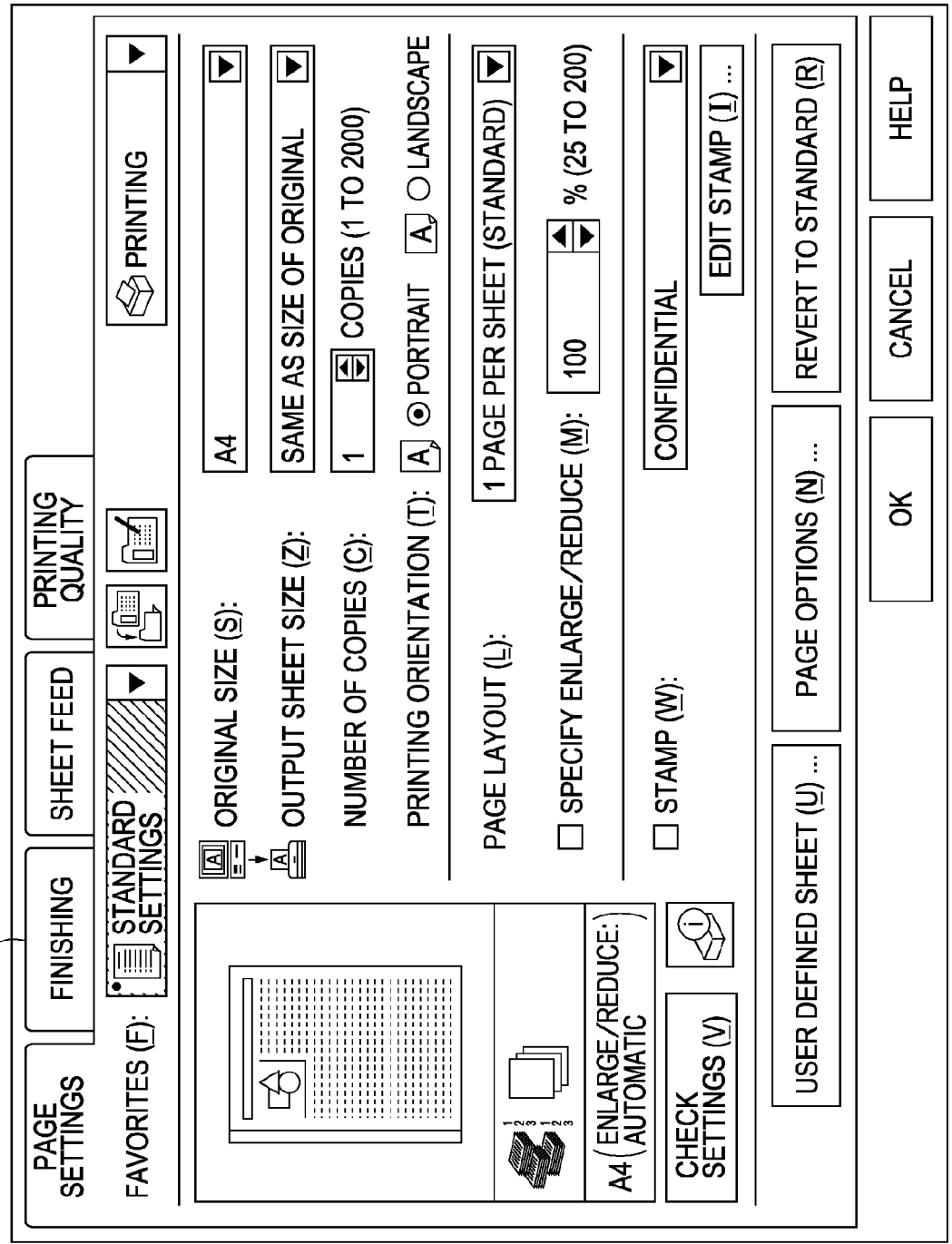
FIG. 7 is a diagram illustrating a display control example of a user interface unit to be controlled according to an embodiment of the present invention.
Figure 8:
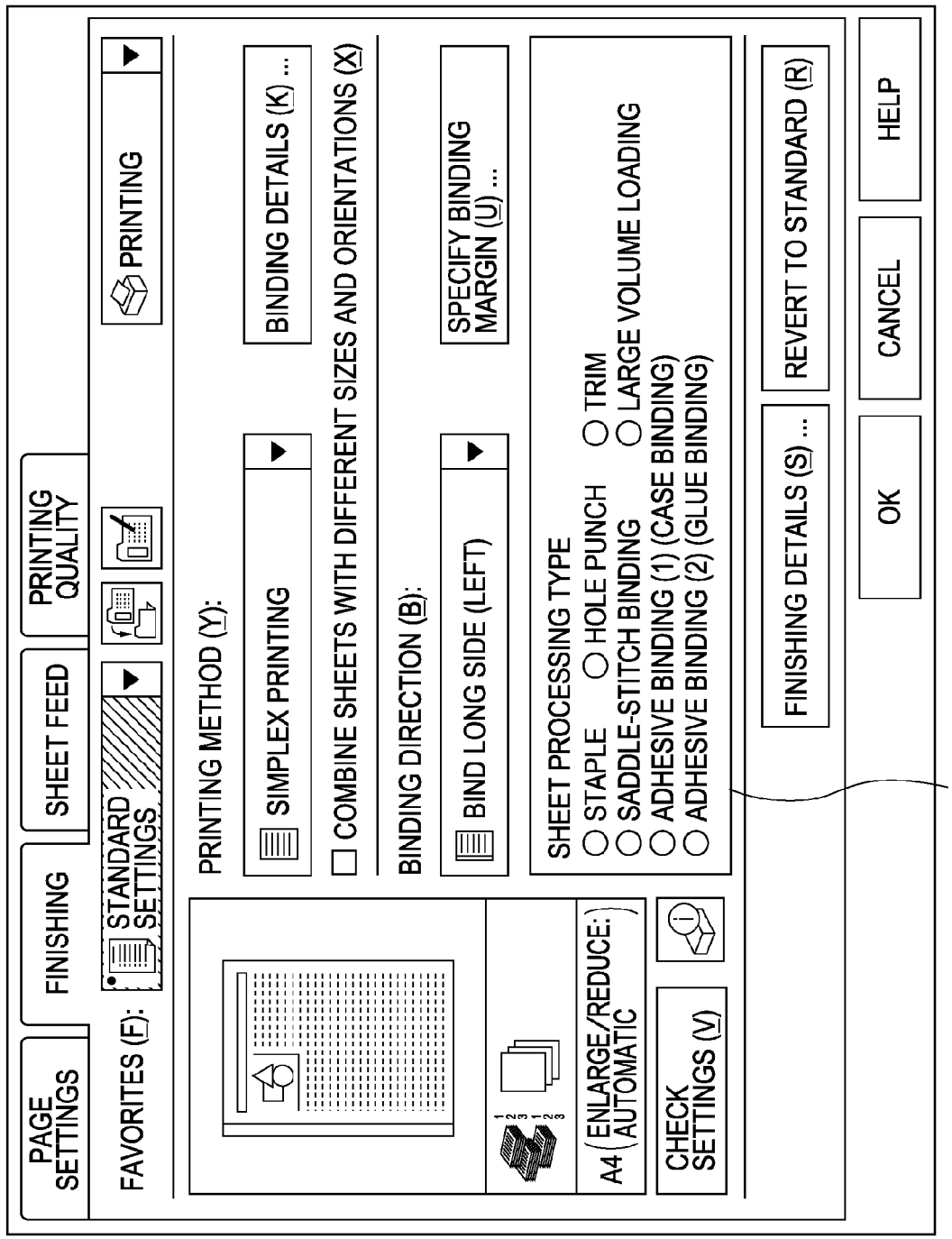
FIG. 8 is a diagram illustrating a display control example of a user interface unit to be controlled according to an embodiment of the present invention.

FIGS. 7 and 8 are setting screens provided by the printer driver of the host computer. For example, upon the finishing key 1701 of the setting screen in FIG. 7 being pressed with the user operating a mouse, the CPU of the host computer displays a setting screen such as shown in FIG. 8. The user uses the setting screen in FIG. 8 to set the types of sheet processing to be executed with the inline type sheet processing apparatus 200 of the system 1000. Note that although omitted here, the host computer can execute processing and controls similar to the various types of processing and controls described with the present embodiment (for example, 1702).

The CPU of the host computer transmits the printing jobs generated using the commands showing the various printing conditions set by the user via these setting screens, and the printing data printed with the printing unit 203, to the printing system 1000. The system 1000 executes printing processing, sheet processing, and so forth based on the printing job transmitted from the host computer.

Figure 9:
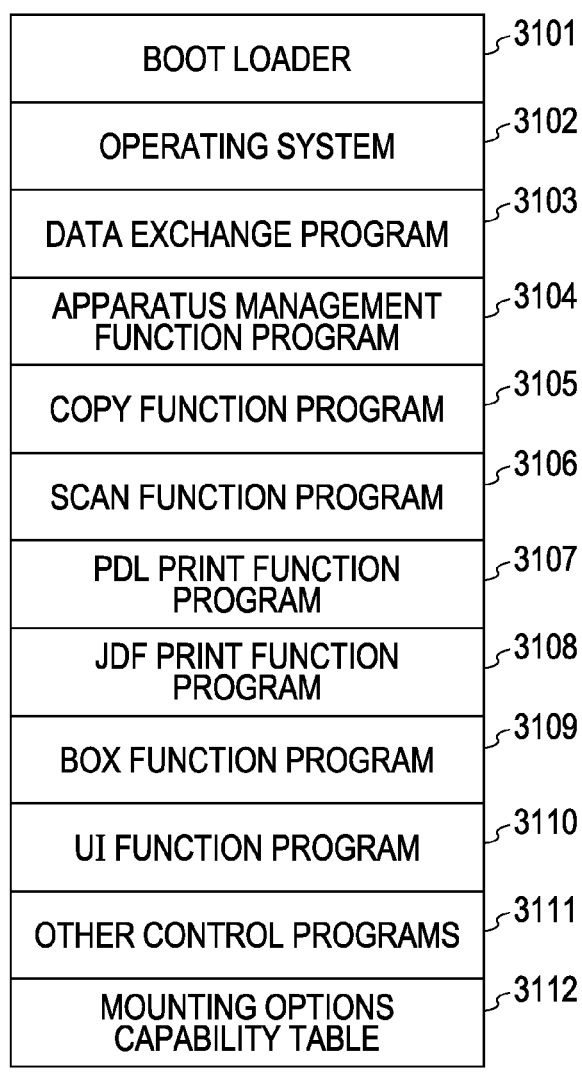
FIG. 9 is a diagram describing content stored in a ROM 207 to be controlled according to an embodiment of the present invention.

FIG. 9 exemplifies various types of programs that are stored in the ROM 207 in FIG. 2 and read by the controller unit 205 of the printing system 1000, and data used by such programs and the like. As shown in the diagram, a program to execute the various types of functions that can be provided by the printing system 1000 is stored in the ROM 207.

A boot loader 3101 is a program executed immediately following the power of the printing system 1000 being turned on. A program to execute various types of starting sequences necessary for starting the system is included in the program.

An operating system 3102 is a program to provide various program executing environments to realize the functions of the printing system 1000. The operating system 3102 provides the memory of the printing system 1000, i.e. resource management such as ROM 207, RAM 208, and hard disk 209 in FIG. 2, and functions such as basic input/output controls of the various devices shown in FIG. 2.

A data exchange program 3103 is a control program to perform exchange processing in the event that a data input/output request is generated via the external interface 202 in FIG. 202. Specifically, the data exchange program 3103 includes a protocol stack such as TCP/IP or the like, and is a control program for various types of data communication between the external devices connected via the network 101 in the printing environment 10000 shown in FIG. 1. The communication processing performed here manages the specialized processing of the communication processing such as the HTTP server and the exchange level of the data packet input/output between the printing system 1000 and network 101, but analyzing processing related to content of data received as will be described later is not included. The data analyzing processing is executed based on the description content of a separate program by the controller unit 205 described later.

An apparatus management function program 3104 is a program executed when the system is started and when changes occur to the state of the connected devices. That is to say, the apparatus management function program 3104 is a program to perform overall management such as connection state, status, function and so forth of various types of devices to realize the functions that the printing system 1000 manages and serves as an MFP. The above-mentioned various types of devices indicates devices such as a printer unit 203, scanner unit 201, sheet processing apparatus 200, detachable devices or non-detachable devices, and so forth.

A copy function program 3105 is a program to execute copy function in the event that the user of the printing system 1000 instructs execution of the copy function via the operating unit 204. The various devices mentioned above include the scanner unit 201, printer unit 203, sheet processing apparatus 200, hard disk 209, compression/decompression unit 210, RAM 208, and so forth.

The scan function program 3106 is a program to execute copy function in the event that the user of the printing system 1000 instructs execution of the scan function via the operating unit 204.

A PDL function program 3107 is a program to execute PDL (page description language) printing function executed with the controller unit 205 by instructions from the external interface 204 in the case that PDL data is received by the printing system 1000. The PDL printing function performed by the controller unit 205 sequentially instructs each device operation in an appropriate sequence with the controller unit 205 based on the process sequence and processing conditions described in the program. As a final result thereof, the PDL data is interpreted and printing processing is executed. The various devices include the sheet processing apparatus 200, printer unit 203, hard disk 209, compression/decompression unit 210, RAM 208, and so forth.

A JDF print function program 3108 is a program executed by the controller unit 205 by instructions from the external interface 204 in the case that a printing job including a job ticket is received by the printing system 1000 via the external interface 202. The JDF print function performed by the controller unit 205 sequentially instructs each device operation in an appropriate sequence with the controller unit 205 based on the process sequence and processing conditions described in the program. Consequently, the controller 205 performs control such that JDF print processing is executed. The various devices include the sheet processing apparatus 200, printer unit 203, hard disk 209, compression/decompression unit 210, RAM 208, and so forth.

A BOX function program 3109 is a program to execute a BOX function executed by the controller unit 205 by instructions from the external interface 204 in the case that the user of the printing system 1000 instructs execution of the BOX function via the operating unit 204.

Figure 4:
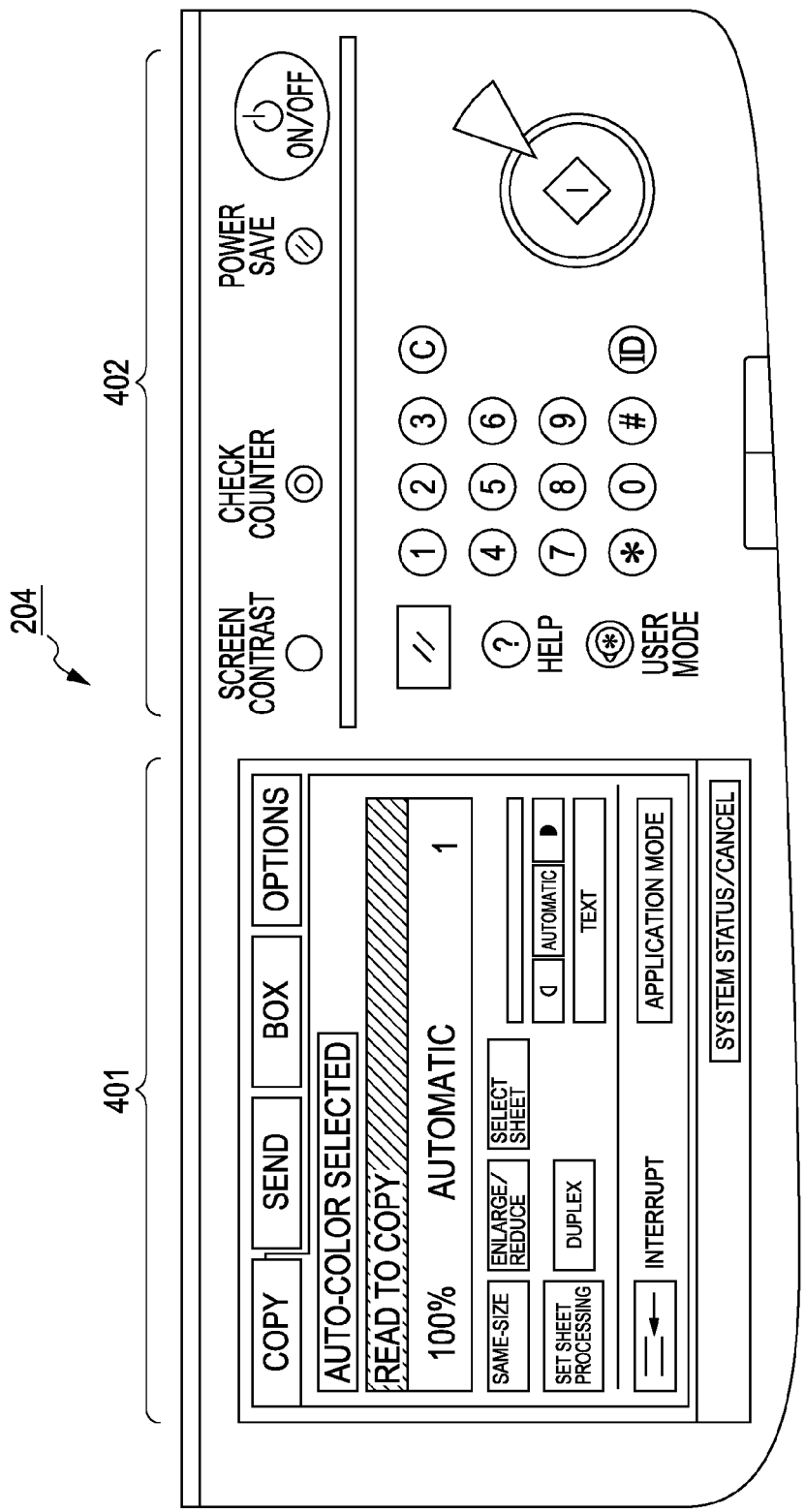
FIG. 4 is a diagram illustrating an example of a user interface unit to be controlled according to an embodiment of the present invention.

A user interface control program 3110 is a program to control the touch panel unit 401 and key input unit 402 of the operating unit shown in FIGS. 4 through 6. The UI control program 3110 identifies content input by the user of the printing system 1000 with the operating unit 204 and performs appropriate screen transfers and processing request instructions as to the controller unit 205.

Other control programs 3111 are programs to execute functions not equivalent to any of the above-described programs, and various types of operations are included herein.

A mounting options capability table 3112 is table information that statically holds the function information of apparatuses detachable from the printing system 1000. The capability information is referenced in the event of modifying processing content of the mounting options capability, in order for the controller unit 205 of the printing system 1000 to process various types of data, or in order to manage the apparatuses. Note that the table name is called the mounting options capability table. However, the mounting options do not only reference apparatuses detachable to a device such as with the sheet processing apparatus in FIG. 3, for example (e.g. large-capacity stacker, glue-binding apparatus, saddle-stitch binding apparatus). That is to say, the printing apparatus main unit 100 and the scanner provided to the printing apparatus main unit 100 may be managed within the same table as a mounting option form. Description will be given based on the case wherein the information relating to the printing apparatus main unit 100 is managed within the same table similar to a detachable apparatus.

Figure 10:
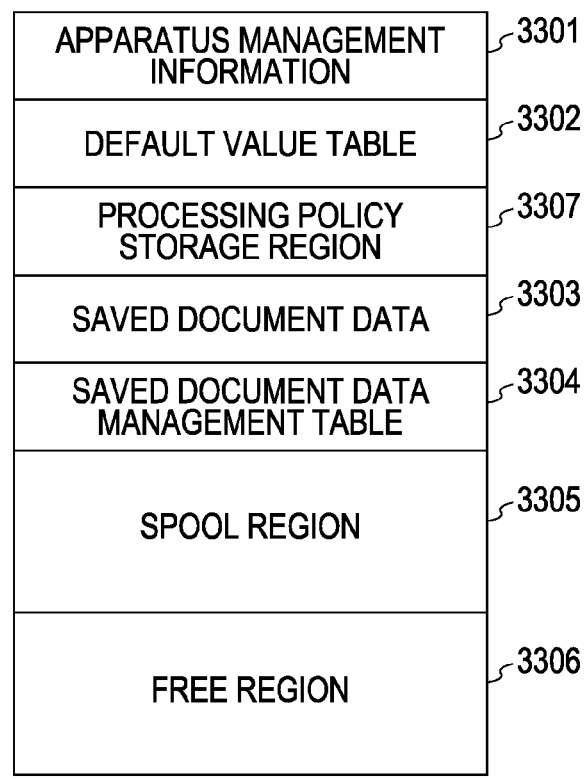
FIG. 10 is a diagram describing various types of data stored in a hard disk drive included in the configuration of the printing system to be controlled according to an embodiment of the present invention.

FIG. 10 exemplifies a storage state of various types of data stored within the hard disk 209 in FIG. 2, and read from or written with the controller unit 205 of the printing system 1000. The information stored within the hard disk 209 movably changes according to the usage status of an apparatus and apparatus configuration, and job progress. Therefore, the state shown in FIG. 10 shows the state at a certain point-in-time during operation of the printing system 1000, and does not necessarily mean that the status thereof is constantly the same as that shown in FIG. 10. For example, in the case of receiving multiple large-capacity printing jobs, this is equivalent to another case of the certain point-in-time wherein there is no space region in the diagram.

The apparatus management information 3301 has information such as connection state and status capability of a sheet processing apparatus 200 or the like detachable from the printing system 1000 stored therein. The apparatus management information 3301 is managed with the apparatus managing program 3104 shown in FIG. 9. Information relating to a medium installed in the sheet supply units is also included in the apparatus management information 3301.

A default value table 3302 is a table to reference in order to supplement setting items wherein the setting values are not specified in the job ticket, using default values, in the event of executing a print job including a job ticket input in the apparatus. The default values for each setting item stored in the default value table 3302 can be modified with the operating unit 204. Execution control of the printing jobs based on the default value table is not necessarily limited to a JDF print job.

A processing policy storage region 3307 is a region to hold necessary settings and information to assure a form of output article matching mode. Note that the processing to assure a form of output article matching mode is called an output article form matching mode. Details of the output article form matching mode will be described later.

Saved document data 3303 is equivalent to document data saved in a box (hard disk) of the printing apparatus shown in FIG. 9. A saved document data management table 3304 stored the management information of the saved document data 3303.

A spool region 3305 is a region to temporarily store the data included in the print job transmitted to the printing system 1000 until the relevant print job is completed. Note that the print job includes a job ticket which describes PDL data for rendering the printing content and setting information for the time of printing processing. Also, the printing system may receive the data for rendering the printing content and setting information for the time of printing processing as PDL data. In this case, the PDL data is data equivalent to the print job. That is to say, the term "print job" means data for rendering and data including printing setting information. Also, job ticket and JDF have the same meaning.

The print job that is applicable when execution of the print job is completed is deleted from the spool region 3305 and the region released for the next print job. The controller 205 controls the storage of the print job in the spool region 3305 and the region release after job completion.

A free region 3306 is equivalent to a region within the hard disk 209 other than the above-described region and the status of the region changes moment-by-moment according to the progress state of the processing with the printing system 1000, and depending on the usage load of the hard disk 209, there may be cases wherein there is no free region 3306.

Figure 11:
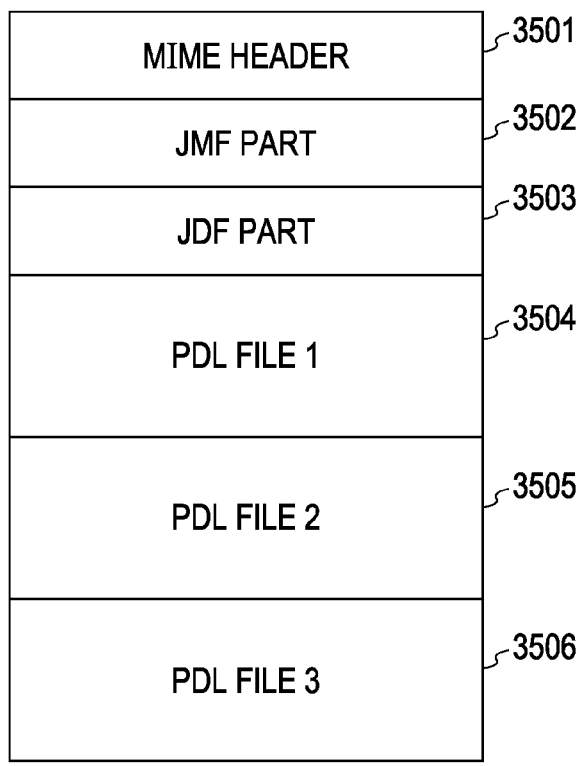
FIG. 11 is a diagram describing the configuration of job data of a JDF print job that can be processed with the printing system to be controlled according to an embodiment of the present invention.

FIG. 11 exemplifies a configuration of the print job. With the print job included in the job ticket, data to be processed is incorporated into a single package with a MIME format, and the printing system receives data encoded with the MIME format. The data to be encoded is PDL data to render the printing content, a job ticket region describing printing setting information, and a management region for to perform communication between apparatuses making up the POD workflow and status management.

With the present example, processing of a print job with MIME format is assumed. However, it goes without saying that even in a case that a JDF job is input with a format other than the MIME format, the advantages of the present invention are still effective as long as the conditions described in the Claims are satisfied.

The MIME header 3501 is a header region necessary in the event of incorporating multiple parts into a single package with the MIME format, and MIME management information such as the data size for the entire MIME package is stored herein.

A JMF part 3502 is a region to store management information for performing communication and status managing exchanged between apparatuses making up the above-described POD workflow.

A JDF part 3503 is a region to hold the above-described job setting information. The format and setting information of the job ticket is written in JDF specifications issued by a CIP 4 serving as the state of the JDF. Even in the event that the JDF print function of the printing system 1000 is realized, this is presumed to be processed based on described items in the specifications, whereby detailed description will be omitted. Accordingly, in order to exemplify a minimum specific example to describe the advantages of the present embodiment, a specific example of the job ticket will be shown and an overview thereof will be described with a later diagram.

The following PDL file 1 (3504), PDL file 2 (3505), PDL file 3 (3506) are content data to render the printing content. With the example in the diagram, an example of the case of 3 pieces of content data included in the MIME package is shown. The amount of PDL content is not limited in specification, and cases other than the 3 pieces of content in the diagram are similarly processed. Also, with the JDF specifications, there may be cases wherein the PDL content is held in an external file system or the like instead of included in the MIME package, and only the URL of the file held in the external file system is described in the JDF. In such a case, content data may be processes by performing a PULL of the file held in the external file system based on the URL. However, detailed description of the operations at the time of PULL of the content file will be omitted in the description of the present embodiment. Note that an RFC is defined relating to the specifications of the MIME format itself, so detailed description thereof will be omitted.

Figure 13:
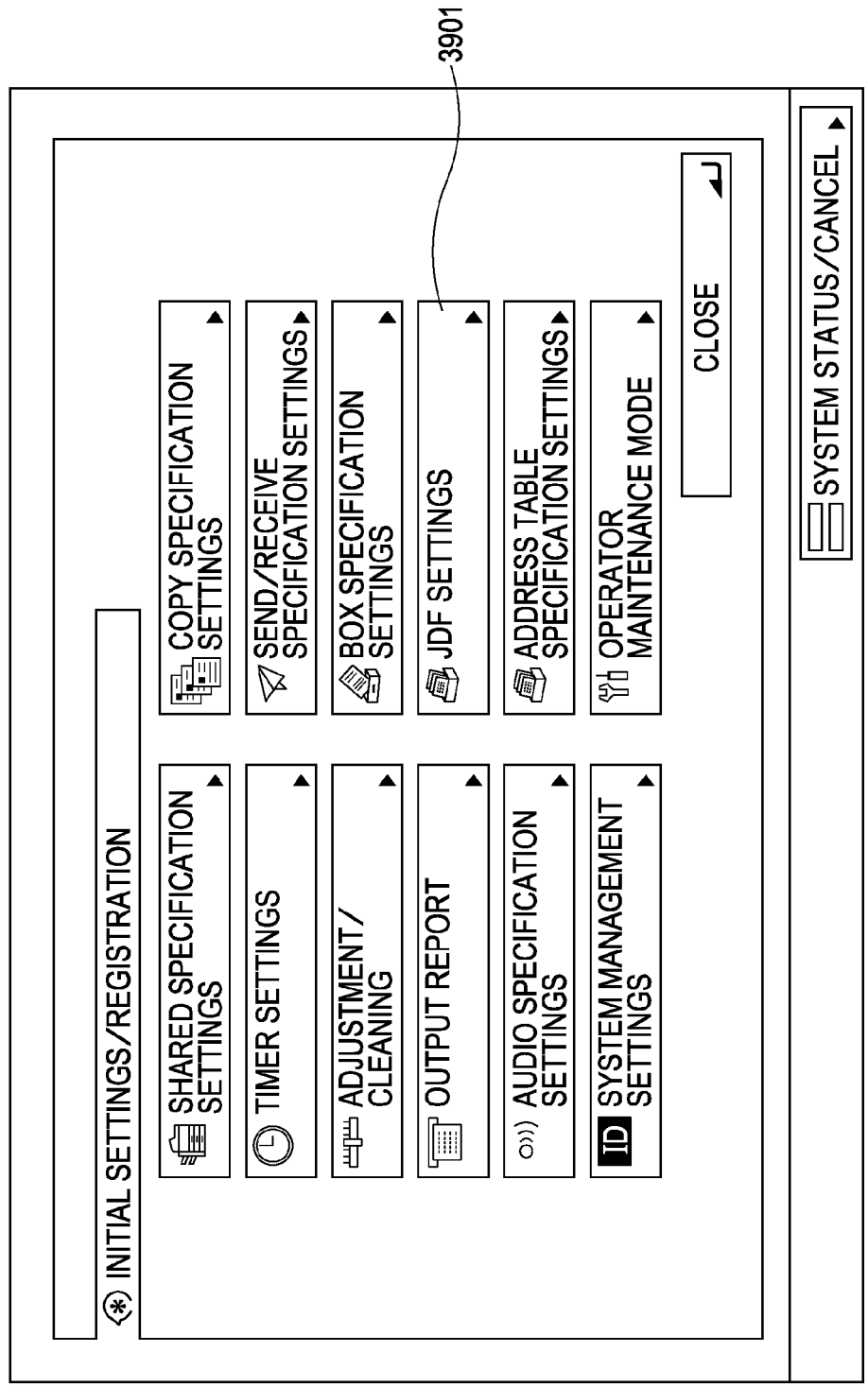
FIG. 13 is an example illustrating a setting screen example relating to a JDF function as to the user interface unit of the printing system to be controlled according to an embodiment of the present invention.

FIG. 12 is an example of description content of a job ticket of a JDF part 3503 included in the MIME package in FIG. 11 (3701-3704). FIG. 13 shows an example of a system setting screen displayed upon a user mode key 505 shown in FIG. 5 being pressed. Of the multiple system setting function buttons displayed in FIG. 12, the role of the JDF setting button 3901 will be described.

In accordance with instructions from the JDF setting button, the printing system 1000 displays an operating screen to perform setting related to an operation of a JDF print job. Immediately following the JDF setting button 3091 being pressed, the operating screen shown in FIG. 14 is displayed on an LCD screen.

Figure 14:
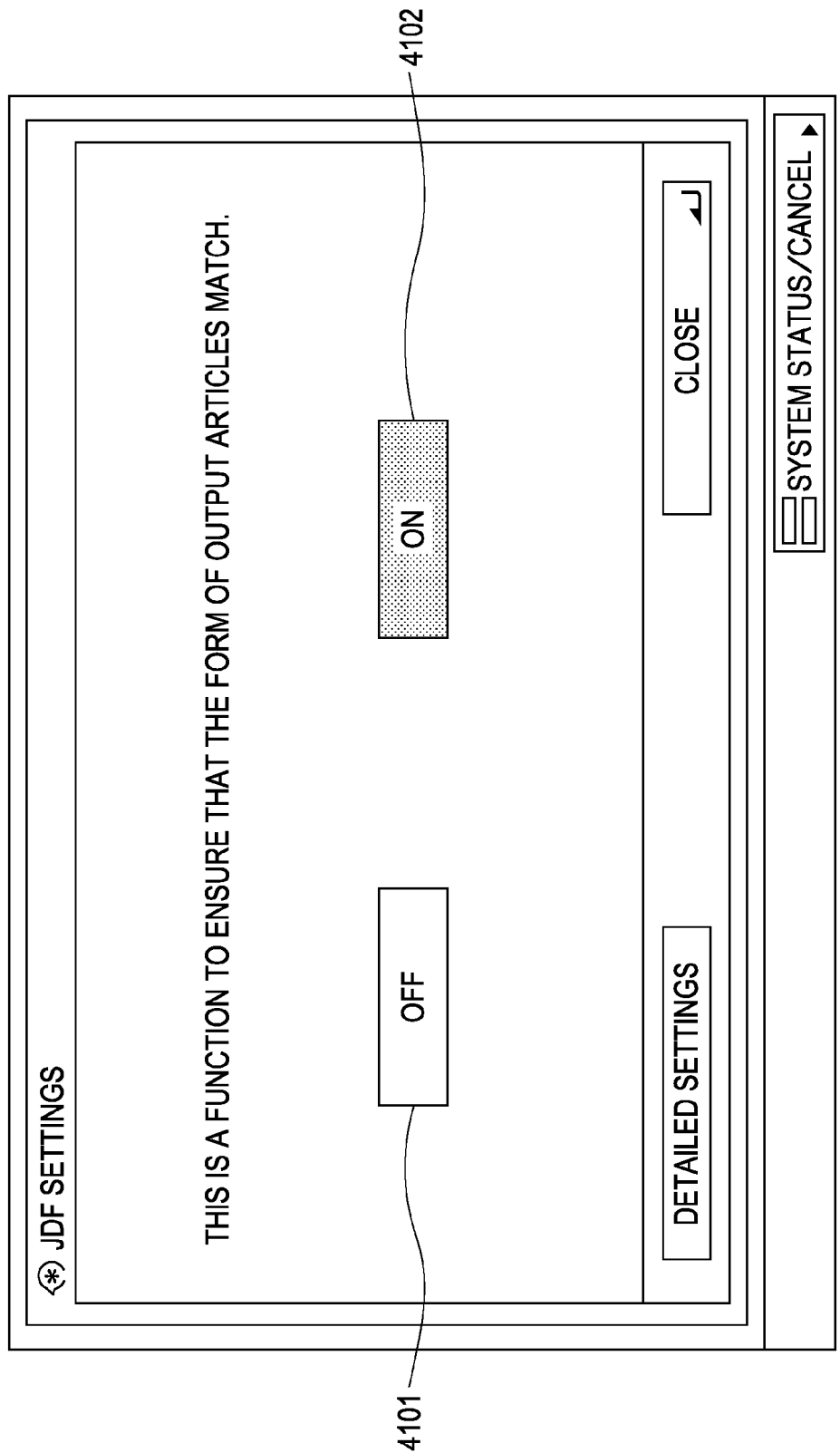
FIG. 14 is an example illustrating a setting screen example of a form of output article matching mode.

FIG. 14 is a setting screen for the output article form matching mode. Operations that a user can select on this screen are one of the OFF button (4101) of the output article form matching mode and the ON button (4102) of the output article form matching mode. That is to say, by setting the output article form matching mode to ON, for example the output modes of an output article output with the first printing processing and an output article output with a reprinting processing can be matched.

FIG. 15 shows a JDF analysis result table generated after the analysis of the JDF part 3503 shown in FIG. 11. The table herein is generated by the JDF print function program 3108. An example of timing of the table generated is after print job exemplified in FIG. 11 is input in the apparatus via the external interface 202 and the JDF part 3503 analysis of the input job is completed. The table is held in the RAM 208. As shown in the diagram, the table in FIG. 15 is made up of two fields.

A function field pass 4301 is a field to store the types of setting attributes (setting items) for the various functions obtained by analyzing the job ticket. An analysis result field 4302 is a field to store the setting values (attribute values) obtained by analyzing the job ticket according to type of setting attribute shown with the function field 4301.

The controller unit 205 executes the print job using analysis results of the analysis result field. Of the setting values already analyzed shown in FIG. 15, one of the setting attributes to take note of when describing the advantages of the output article form matching mode is a duplex printing attribute 4303, and the other is a media attribute 4304.

The duplex printing attribute 4303 is a printing attribute to instruct the faces to be printed at the time of printing processing, i.e. simplex printing or duplex printing. However, with the analysis results in FIG. 15, the analysis result for the duplex printing attribute is blank. This indicates analysis results in the case that a clear setting for duplex printing attributes did not exist in the job ticket of the print job. In this case, the printing system 1000 performs printing processing using a default value (panel value) held by the apparatus. The default values (panel values) of the various printing attributes are held in the default value table 3302 in FIG. 10. Note that the default value (panel value) is a setting value set with the device, and therefore may be also called a device setting value.

Also, in FIG. 15, the media attribute (sheet item) 4304 is a printing attribute to instruct the media used with the printing processing. However, in FIG. 15, deck 1 is written as the analysis result of the media attribute (sheet item). This indicates that the media set in the deck 1 is supplied at the time of printing.

FIG. 16 describes the details of the default value table 3302 in FIG. 10 (4501-4503). The information stored in the present embodiment is similar to the JDF analysis result table shown in FIG. 15, and in FIG. 16 the default values (panel values) are stored instead of the setting values (analysis values) of the printing attributes of the JDF analysis result table in FIG. 15. The default values (panel values) of the printing attributes stored in the default value table 3302 can be modified by the operating unit 204.

Figure 17:
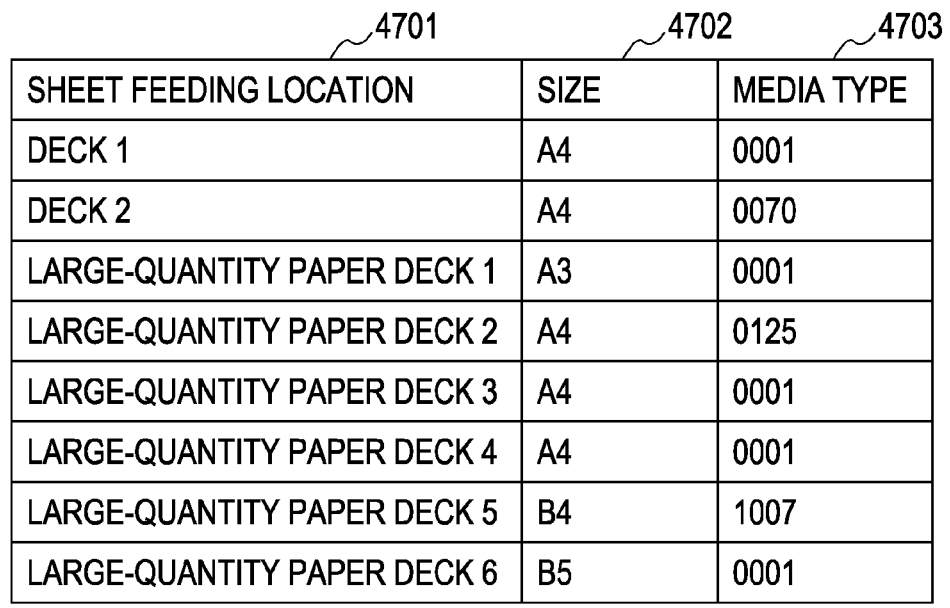
FIG. 17 is a diagram describing an example of a managing information table relating to media.

FIG. 17 shows a table indicating an example of a sheet feeding deck loaded on the printing system 1000 and the type of media loaded in the sheet feeding decks, managed within the apparatus management information region 3301. The table in FIG. 17 is made up of a sheet feeding location field 4701, size field 4702, and media type field 4703.

The sheet feeding location field 4701 is a field that holds identification information (ID) corresponding to the position of the sheet feeding deck loaded on the printing system. Note that the ID may be a name or a symbol, as long as the information can identify each sheet feeding deck.

The size field 4702 has size information stored therein of the media loaded in the sheet feeding deck identified by the sheet feeding location field 4701. The media type field 4703 has identifying information (ID) stored therein to indicate the type of media installed in the sheet feeding deck identified by the sheet feeding location field 4701. With the media size stored in the size field 4702 and the media type ID stored in the media type field 4703, the media used at time of printing is uniquely identified.

Note that FIG. 17 exemplifies a media information table of the state that media is loaded in all of the sheet feeding decks. In the case that a sheet feeding deck exists without any media loaded therein, the size field 4702 corresponding to the sheet feeding location field 4701 equivalent to the sheet feeding deck and the ID stored in the media type field 4703 are blank.

FIG. 18 shows an example of an attribute conversion table held in the processing policy storage region 3307 in FIG. 10. The attribute conversion table describes conversion rules relating to setting values in order to assure a form of output article matching mode in the output article form matching mode.

The examples shown in FIGS. 15 and 18 will be described in detail. In the JDF analysis result table in FIG. 15, the duplex printing attributes 4303 use the default values (panel values) described above. That is to say, the controller unit 205 uses "duplex" which is the default value of the duplex printing attribute in FIG. 16 as to the blank cell in the duplex printing attribute in FIG. 15.

However, the setting values stored in the default value table 3302 can be modified with the operating unit 204 as described above in the description of FIG. 16. That is to say, even in the case of using the same print job to instruct reprinting, the setting values of the default value table are not necessarily the same as the time of previous printing. This is because from the time of the previous printing until reprinting is instructed, there is the possibility that the default values have been modified with the operating unit.

From this occurs the earlier-described problem regarding the field of the present invention. That is to say, even in the case of processing the same print job, in the case that the default values are modified using the operating unit from the time of the previous printing until reprinting is instructed, an output article different from the output article at the time of previous printing is output at the time of reprinting.

Also, there is the possibility of similar problems occurring with the media attributes 4304 in the example of the JDF analysis result table shown in FIG. 15. That is to say, with the example in FIG. 15, the value of the media attribute 4304 shows as deck 1. That is to say, the sheet feeding deck is specified in order to specify the media used at the time of printing. With the present example, the media loaded in deck 1 has the media size of A4 and media type of 0001, as shown in FIG. 17. Therefore, with this state of the apparatus, when the print job including the job ticket showing the analysis result in FIG. 15 is input, the printing system executes printing processing using the media identified by the media size A4 and media type 0001 for the print job thereof.

However, generally, the media loaded in the sheet feeding deck is modified according to the usage state of the apparatus. This is because the number of sheet feeding decks is limited, while the media type and media size used for the print jobs is modified each time according to the job content thereof. That is to say, the media type in deck 1 for the print job to be processed next can easily be modified following completion of the print job.

Accordingly, there is a possibility that the media loaded in the deck 1 at a certain point in time is not necessarily loaded at the point in time of reprinting. Therefore, in the case of executing reprinting using the print job specified so as to use the media loaded in the deck 1, there is certainly the possibility that at the point in time of receiving reprinting instructions, the media loaded in the deck 1 for the previous time is a different media. In this case, even if the printing processing using the same print job is executed, similar sheets are not used for printing, whereby the user may not be able to obtain the desired output article.

The above-described problem results from the printing attributes and setting values in the job ticket analysis results not specifying the mode of the output articles. According to the present invention, the above-described problems are resolved by converting the setting values not instructing the mode of the output articles as described into setting values that instruct the mode of the output articles.

The table in FIG. 18 is made up of three fields. The attributes before conversion field 4901 is a field storing the printing attributes not instructing the mode of output articles described above. That is to say, the setting values stored in this field requires conversion in order to match the output mode of output articles at a certain point in time with the output articles at time of reprinting.

The attribute value field 4902 is a field to store the setting values set in the attributes written in the attributes before conversion field 4901. An attributes after conversion field 4903 is a field to store the attributes and setting values to be converted in the event that a combination written in the attributes before conversion field 4901 and attribute value field 4092 is detected during analysis of the job ticket.

In FIG. 18, three records describing conversion rules are exemplified in the attribute conversion table. That is to say, with the record 4094, a rule is described stating that when the value of the media attributes is automatic, the value of the media attributes at reprinting is replaced with the media size and media type used with the previous printing. With the record 4905, in the case that the media attribute value is sheet feeding deck, a rule is described stating that the value of the media attribute at reprinting is replaced with the media size and media type used with the previous printing. Also, with the record 4906, attributes before conversion mean all attributes, and regulates processing executed in the case that the attribute values are omitted within the job ticket. That is to say, a rule is described stating that in the case that the description relating to the attribute values are omitted in the job ticket, the default values (panel values) are referenced from the default value table 3302 and employed.

FIG. 19 shows an example of a JDF analysis result table showing the results of the tables in FIGS. 15 through 18 referenced and converted, as to the analysis results exemplified in FIG. 15, in the case wherein the output article form matching assurance mode according to the present invention is valid (5101-5104). As shown in the diagrams, we can see that the duplex printing attribute 4303 and media attribute 4304 requiring further conversion in order to assure output article form matching are converted according to the rules in FIG. 18. For example, for the duplex printing function, duplex printing is executed according to the default values, whereby a setting value called duplex is stored in the duplex printing attribute in FIG. 19 (5103 in FIG. 19). Naturally, in the case that simplex printing is executed according to the default values, simplex is stored in the duplex printing attribute in FIG. 19. On the other hand, for the media attributes, setting values are stored which indicate that sheets equivalent to the A4 size and ID 0001 as stored in the deck 1 are used. Note that the JDF generated with reprinting from the received JDF is defined as a reply JDF.

FIG. 20 shows an example of the first JDF input in the printing system 1000, i.e. an example of the job ticket before conversion. The JDF before conversion as shown in FIG. 20 includes the setting values that cannot assure a match with the output article form. That is to say, this is a case wherein the default values (panel values) are applied to the duplex printing of the analysis results shown in FIG. 22.

Also, the sheet feeding deck (sheet feeding location) is specified as instructions of the media attributes 4304 used at time of printing. That is to say, this is a case wherein the media selected at the time of job execution changes depending on the state of the apparatus. Specifically, in the locations shown with 5301 in FIG. 20, the value of duplex attribute "Side" is omitted, and in the locations shown with 5302, media attribute "Location" i.e. sheet feeding deck is specified.

FIG. 21 is a diagram showing the results of setting values to be replaced so as to assure output article form matching are replaced, by the job ticket before conversion in FIG. 20 applying the present invention in the case that the output article form matching mode according to the present invention is specified. The job ticket in FIG. 21 is a reply JDF as described above in the description of FIG. 19.

The reply JDF in FIG. 21 is subjected to replacement processing based on the description content of the attribute conversion table to assume output article form matching with the job ticket before conversion as shown in FIG. 20. Specifically, in the locations shown with 5501, the value of the duplex attribute "Side" is supplemented with the value of the default value table in FIG. 16, and replaced with a setting value meaning duplex. Also, in the locations shown with 5502 and 5503, the setting values of the media attributes are converted to the "Dimension" attribute indicating media size and "Type" attribute indicating media type.

Figure 22:
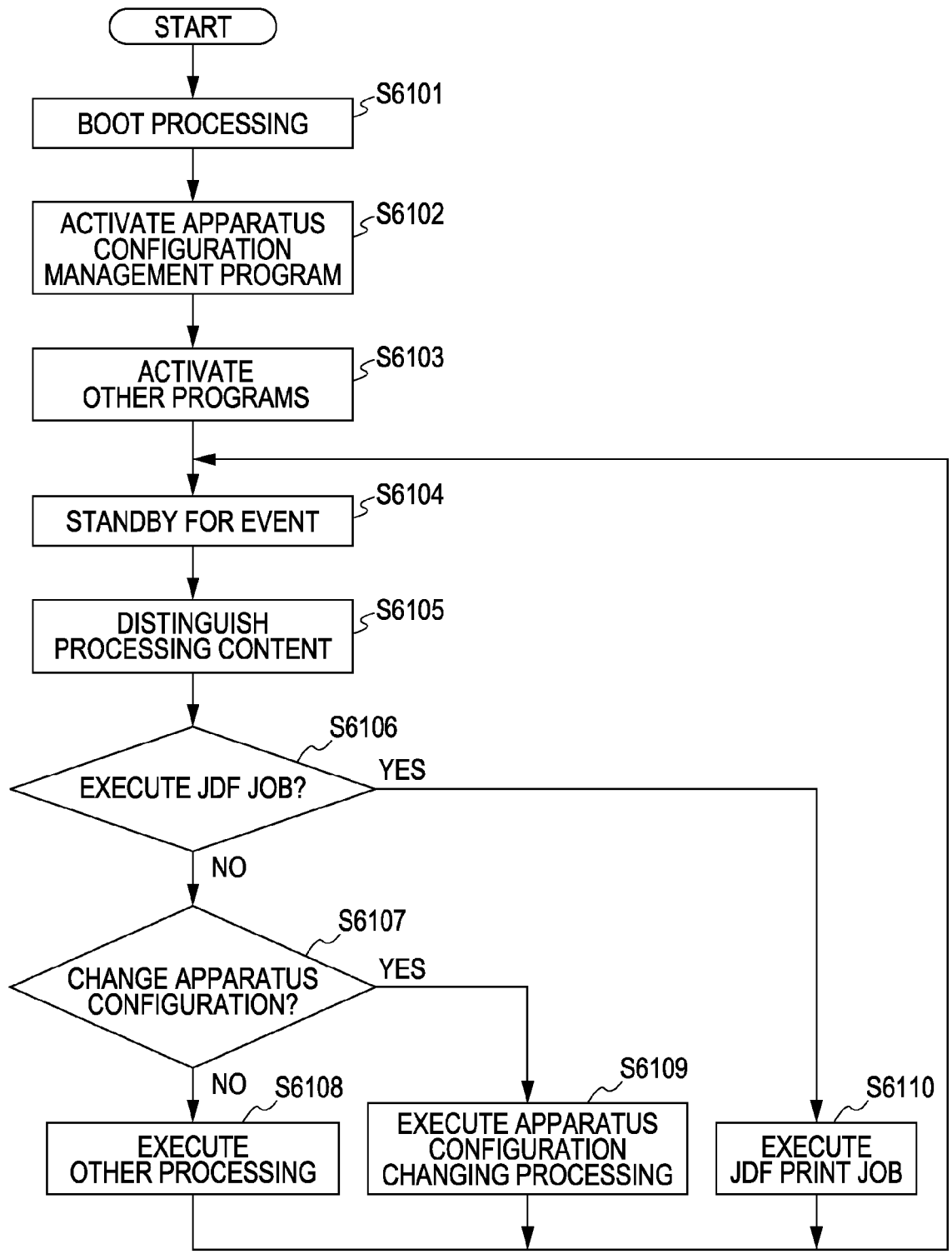
FIG. 22 is a flowchart describing the printing system 1000 to be controlled according to an embodiment of the present invention.

FIG. 22 is a flowchart to describe the processing executed with the controller unit 205 in FIG. 2. Note that each of the processing steps of the flowchart in the present embodiment is executed by the controller 205 in FIG. 2.

First, the controller unit 205 executes boot processing upon the power being turned on (step S6101). Specifically, the controller unit 205 reads and executes the boot loader 3101 in FIG. 9 from the ROM 207. The processing in S6101 includes all of the initializing processing applicable to the initializing processing such as issuing initializing commands for the various types of resources and devices connected to the present printing system, cleaning performed immediately following apparatus startup, and so forth. Also, the processing performed by the boot loader 3101 is a process from reading the operating system 3102 until the service of the operating system is started.

Upon boot processing being completed, the controller unit 205 starts the apparatus management function program 3104 stored in the ROM 207 (step S6202). The controller unit 205 checks the device connection state with the apparatus management function program 3104 executed in the same step.

Next, the controller unit 205 reads and executes programs other than that described above from the ROM 207 (step S6103). Of the various types of programs stored in the ROM shown in FIG. 18 to be loaded in this step, a program is indicated that excludes that which is already read into the above-described step.

The controller unit 205 moves to the standby for event state in step S6104. The event indicated here includes at least the following processing. A first event is processing for a user to input job execution instructions or setting modifications using the operating unit 204. A second event is processing for a print job to be input as to the printing system 1000 from an apparatus external to the printing system 1000 via the external interface 202. A third event is processing to receive a request for receiving a JDF print job or execution of a received job. Also, a fourth event is processing to receive a processing request other than a job input as to the printing system 1000 from an apparatus external to the printing system 1000.

The processing request other than the job input may be obtaining apparatus status, for example, or a modification or the like to various types of setting information or management information stored in the apparatus. In the case that some sort of event occurs in step S6104 and the event thereof is notified to the controller 205, the flow is advanced to the steps after step S6105, the occurred event is identified, and operations corresponding to the occurred event are executed. Accordingly, the controller 205 distinguishes the type of event that has occurred in S6105.

With the distinguishing in step S6105 executed at the time of event occurring, the controller unit 205 determines whether or not the occurred event is a JDF job execution start request.

The JDF job execution start request is an event issued as to the controller unit 205 at the stage of determination made that the interface 202 unit in FIG. 2 has received the JDF job data from the external apparatus. In the case determination is made that the event occurred in step S6106 is a JDF job execution start request (in the case the JDF job data is received), the processing of the controller unit 205 is advanced to step S6110. On the other hand as a result of determination in the step S6106, in the case determination is made that the event occurred in step S6106 is not a JDF job execution start request, the processing of the controller unit 205 is advanced to step S6107.

The controller unit 205 executes the printing processing of the JDF print job input as to the printing system 1000 from an apparatus external to the printing system 1000 via the external interface 202 (S6110). Note that the processing of S6110 will be described in detail later with reference to FIG. 23.

As a result of the determination in step S6106, in the case determination is made that the occurred event is not a JDF job execution start request, the controller unit 205 determines whether or not the occurred event has resulted from an apparatus configuration change (S6107). As a result of the determination in step S6107, in the case determination is made that the occurred event has resulted from an apparatus configuration change, the processing of the controller unit 205 is advanced to step S6109, and apparatus configuration change processing is executed.

As a result of the determination in step S6107, in the case determination is made that the incident determined in step S6105 is not an apparatus configuration change processing either, the controller unit 205 executes processing according to the occurred event type (S6108). The processing executed in S6108 may apply to a variety of processes, but the individual types of operations and content of operations thereof are not the primary topic for describing the present embodiment, therefore these will be summarized into a single step for simplicity. However, note that in the same step, execution of multiple processing are included as described above.

Upon the various processing completed in steps S6108, S6109, and S6110 with the controller unit 205, the process is transferred to step S6104, and the controller 205 moves again to the waiting state of the next event processing.

Figure 23:
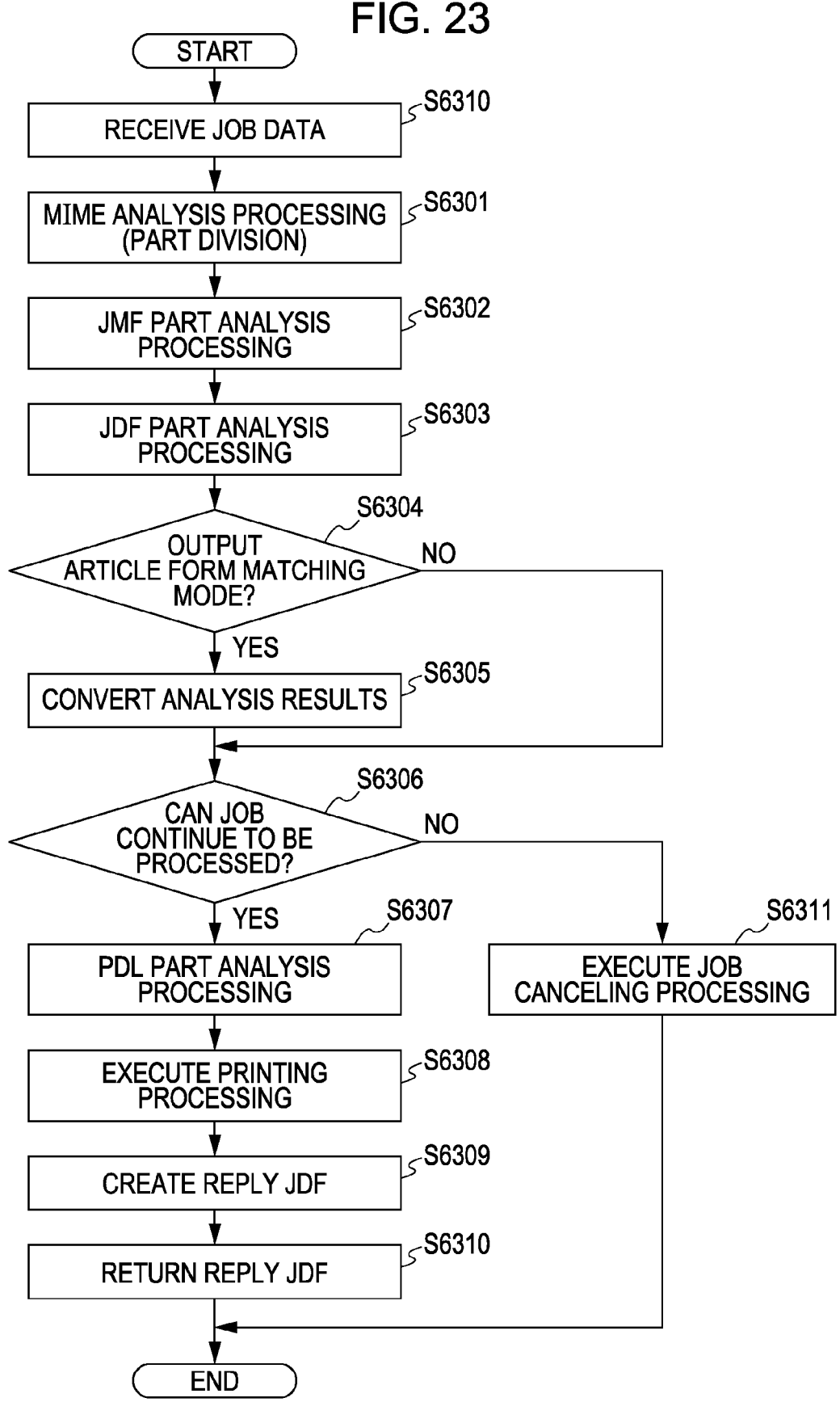
FIG. 23 is a flowchart describing the printing system 1000 to be controlled according to an embodiment of the present invention.

FIG. 23 is a flowchart describing details of the step S6110 shown in FIG. 22. The flowchart shown in FIG. 23 starts from processing wherein the controller unit 205 performs reading of the job data. This is equivalent to processing to receive job data from an external apparatus (e.g. PC 104 and the like) of the printing system 1000 with the format shown in FIG. 18.

The controller unit 205 performs analysis of MIME format of the data making up the JDF print job (S6301). Specifically the content included in the received MIME data is used and cut out, and the cutout data is stored in the hard disk 209. The content cut out from the MIME data in S6310 is the 3 types of JMF, JDF, and PDL data showing rendering data of the printing content, and one or more PDL data is permitted to exist.

The controller 205 analyzes the JMF part stored in the hard disk 209 (S6302). The JMF itself is primarily equivalent to communication and status and so forth when controlling the JDF workflow system, but this is not crucial in describing the advantages of the present embodiment, so the detailed description thereof will be omitted.

Upon the analysis processing of the JMF part in step S6302 being completed, the controller unit 205 performs analysis processing of the JDF part stored in the hard disk 209 (S6303). The processing in S6303 analyzes the job ticket shown in FIG. 20, and relates to the processing to obtain the JDF analysis result table shown in FIG. 15. Note that the detailed processing in S6303 is described alter in FIG. 24.

Next the controller unit 205 determines whether or not the setting values of the output article form matching mode at the time of job executes is valid (S6304). The output article form matching mode is set by the screen shown in FIG. 14.

As a result of the determination in S6304, in the case that the setting value of the output article form matching mode is valid, the controller unit advances the processing to step S6305.

The processing in step S6305 extracts the setting items and setting values not uniquely determining the output article form from the JDF analysis results obtained in S6303, and changes these to setting items and setting values which can uniquely determine the output article form. In other words, this processing is processing to obtain the JDF analysis result table shown in FIG. 19 from the JDF analysis result table shown in FIG. 15. Step S6305 will be described in detail later.

As a result of the determination in S6304, in the case the setting value of the output article form matching mode is invalid, the processing of the controller unit 205 skips step S6304 and advances to step S6306.

The controller unit 205 determines whether or not processing relating to the setting information stored in the JDF analysis result table can be executed based on device capability and status (S6306).

The controller unit 205 analyzes the PDL data for rendering the printing content (S6307). Specifically, the controller unit 205 executes the PDL data analysis and conversion processing to the image data according to the setting information described in the JDF analysis result table, converts the data to a finally printable raster image, and stores the image data after conversion in the hard disk 209.

The controller 205 prints the image data to be printed that is stored in the hard disk 209 in step S6307 (S6308). In this event, the controller unit 205 prints according to the JDF analysis table content generated via the processing in step S6303 or step S6305.

Upon the printing processing in step S6308 completing, the controller unit 205 advances to step S6309 and creates the reply JDF. This is processing to create a job ticket wherein changed setting values are reflected, in the case that setting values are changed as to the received job ticket by the output article form matching mode being valid. In other words, this processing is equivalent to the processing to create the JDF shown in FIG. 21 from the JDF shown in FIG. 20.

Upon creation of the reply JDF being completed, the flow is advanced to step S6310, and the controller unit 205 replies with a reply JDF created in step S6309 to the client which is the job transmission source. Upon the reply processing being completed with step S6310, the flow is returned to step S6104 in FIG. 22.

As a result of determination in step S6306, in the case determination is made that the received job cannot be executed, the controller unit 205 cancels execution of the job (S6311).

Figure 24:
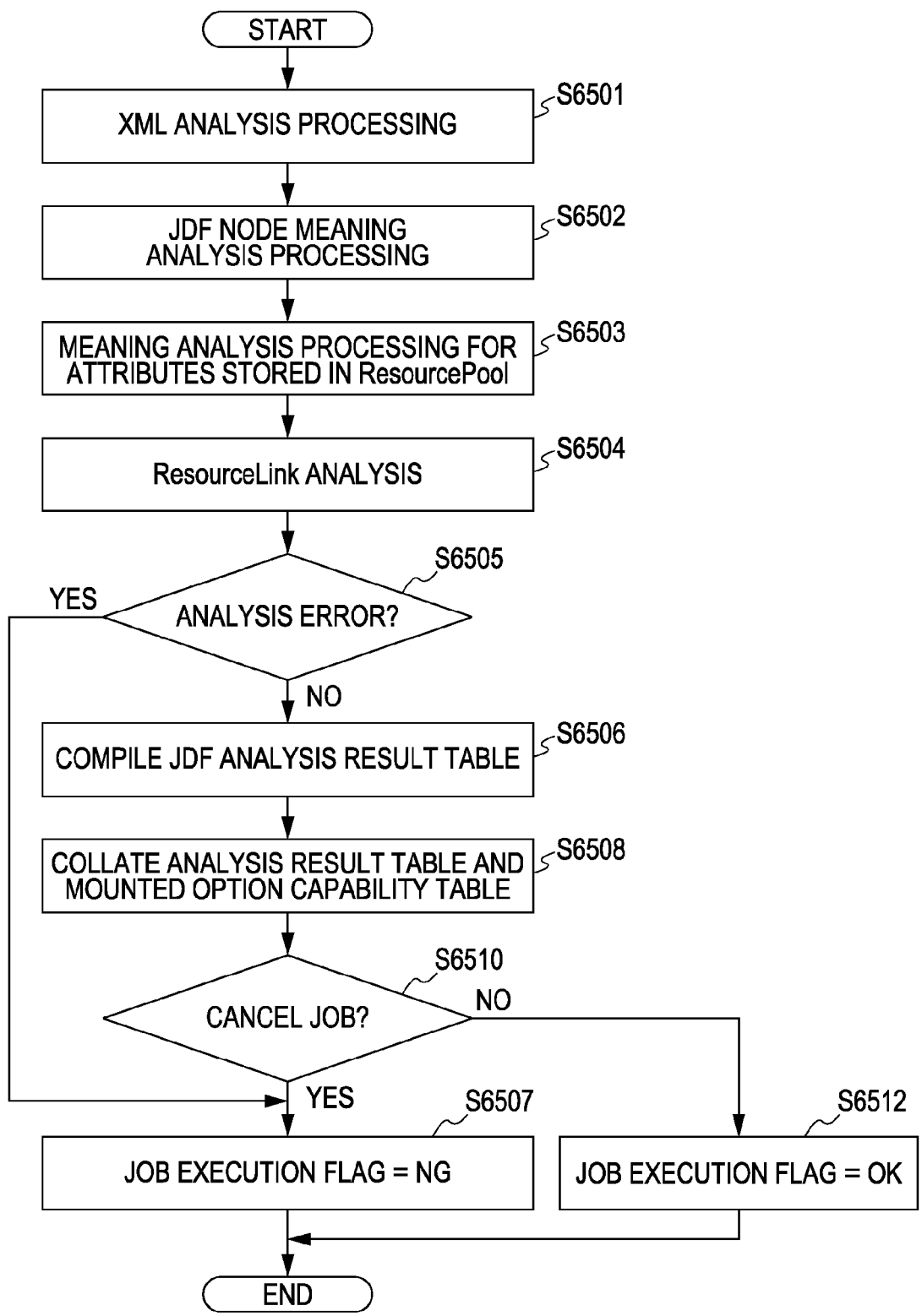
FIG. 24 is a flowchart describing the printing system 1000 to be controlled according to an embodiment of the present invention.

FIG. 24 is a flowchart to describe the details of the processing in step S6303 in FIG. 23. The controller unit 205 first performs XML syntax analysis, and takes in information described in the job ticket (step S6501). The information taken in this step becomes necessary again at the time of later-describe reply JDF creation, thus is stored in the RAM 208 until the job executing processing is completed.

Next in step S6502 and thereafter, the controller unit 205 analyzes the meaning indicated by the information obtained in step S6501. In step S6502 the meaning of the JDF node portion which is a root node of the job ticket is analyzed. Information necessary for job management and information relating to the definition and so forth of the processes whereof the job ticket is to be processed are stored in the node of the job ticket.

Next in step S6503, the controller unit 205 analyses the meaning indicated by the information within a resource pool which is a storage location of the setting parameters at the time of executing the job in the job ticket. Within the resource pool is stored various types of setting information to be reflected such as PDL expansion processing, image process processing such as imposition, printing processing finishing, processing and so forth.

In step S6504, the controller unit 205 executes checking relating to whether or not the JDF process and resource link information are appropriately expressed and whether any contradictory link setting is performed.

Next in step S6505, the controller unit 205 determines whether or not any analysis error has occurred in the processing from the above-described steps S6501 through S6504. In the case determination is made that an analysis error has occurred, the job cannot be executed, whereby the flow is advanced to step S6507 and the job executing flag is set to NG. The job executing flag indicates a portion of information stored in the RAM 208 when the controller unit 205 executes the program performing processing described in the flow herein.

In step S6505, in the case determination is made that an analysis error has not occurred, the controller unit 205 advances the flow to step S6506 and creates the JDF analysis result table. The details of the JDF analysis result table created in this step are described in the description of FIG. 15 so will be omitted here. Upon the processing in step S6506 being completed, the flow is advanced to step S6508.

In step S6508, the controller unit 205 verifies the information in the JDF analysis result table created in step S6506 and the mounting options capability table stored in the apparatus management information field in FIG. 10. Regarding jobs stored in the JDF analysis result table, of the functions described in the mounting options capability table, the functions that cannot be executed with the configuration of the printing system 1000 at the current point in time are extracted. Details of the mounting options capability table are not the primary topic for describing the present embodiment, therefore these will be omitted.

In step S6510, the controller unit 205 determines whether or not to cancel a print job according to whether or not setting information exists that cannot be executed with the apparatus configuration or capability. In the case determination is made to cancel the job as a determination result, the flow is advanced to step S6507 to cancel the job. In the case determination is made to execute the job as a determination result, the flow is advanced to step S6512 and the job executing flag is set to OK.

Figure 25:
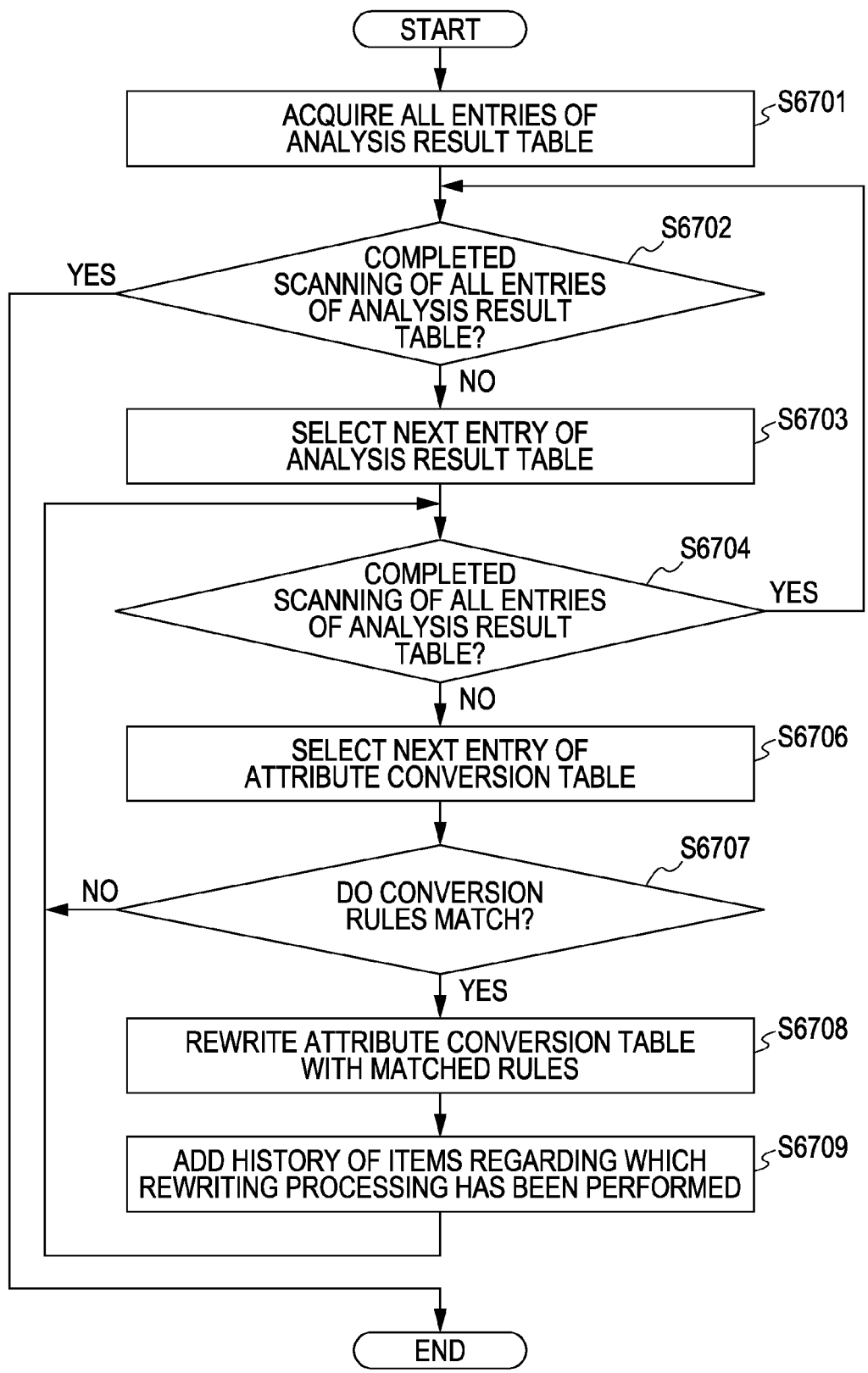
FIG. 25 is a flowchart describing the printing system 1000 to be controlled according to an embodiment of the present invention.

FIG. 25 is a flowchart to describe the processing in step S6305 in FIG. 23. As described in FIG. 23, the processing herein is a series of flow executed only in the case that the output article form matching mode is valid.

The controller unit 205 obtains content of the JDF analysis result table in FIG. 15 (step S6701). Next, the controller unit 205 detects attributes requiring conversion to assure the output article form matching, and setting values, for the content of the JDF analysis result table obtained in step S6701, and executes conversion processing as necessary.

The controller unit 205 determines whether all of the attributes in the analysis result table are checked in step S6702. In the case determination is made that all of the setting items have been checked, the controller unit 205 ends the processing.

On the other hand, as a result of the determination in step S6702, in the case determination is made that of the setting items in the JDF analysis result table, setting items to be checked still remain, the flow is advanced to step S6703, and the next setting item is selected to be checked.

The processing in step S6704 and thereafter is processing to realize the output article form matching mode. In step S6704, determination is made as to whether or not checks are completed for all of the items in the attribute conversion table in FIG. 18.

In the case checks are completed for all items as a result of the determination in step S6704, the processing of the controller unit 205 is returned to step S6702.

As a result of the determination in step S6704, in the case determination is made that checks have not been completed for all of the items in the attribute conversion table in FIG. 18, processing is executed for the remaining items. That is to say, the flow is advanced to step S6706, and the next conversion rule in the attribute conversion table in FIG. 18 is obtained. Determination is then made as to whether or not the attributes and attribute value conversion rules described in the next conversion rule in the obtained attribute conversion table are equivalent to the setting items and setting values in the JDF analysis result table selected in step S6703 (step S6707).

In the case determination is made by the determination in step S6707 that the attribute value conversion rule is equivalent to the setting item and setting value in the JDF analysis result table selected in step S6703, the controller unit 205 performs conversion processing based on the rule in the attribute conversion table (S6708). The conversion result is over-written on the applicable entry of the JDF analysis result table (the result thereof is FIG. 19). Further, the controller unit 205 holds the conversion historical information of the setting items and setting values subjected to replacement processing in the RAM 208 (step S6709). The historical information thereof is employed at the time of creating the reply JDF. Upon completion of the processing in step S6709, the flow is returned to step S6704.

Thus, by executing the processing in FIG. 25, the setting value used with the printing processing that is not included in the received print job (e.g. a setting value indicating duplex printing used for the duplex printing item which had been a blank in the setting value for the print job) is stored.

Figure 26:
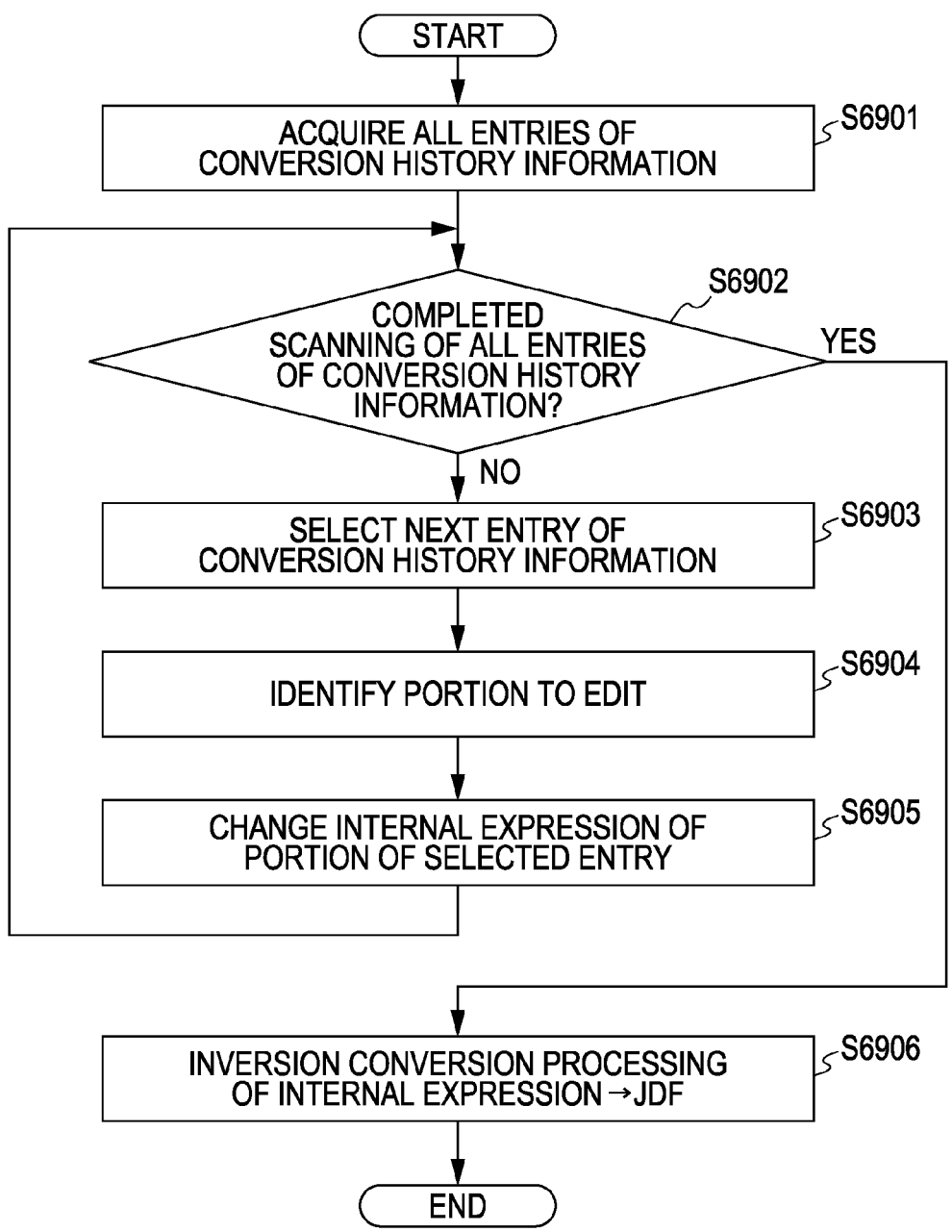
FIG. 26 is a flowchart describing the printing system 1000 to be controlled according to an embodiment of the present invention.

FIG. 26 is a flowchart to describe the step S6309 (replay JDF creating processing) in FIG. 23. In step S6901, the controller unit 205 obtains the historical information created in step S6709 in FIG. 25.

In step S6902, determination is made as to whether or not the historical information obtained in step S6901 has all been reflected.

In the case determination is made with the determination in step S6902 that all of the historical information is reflected, the flow is advanced to step S6903, and the controller unit 205 selects the next historical information and identifies the setting item corresponding to the selected historical information (step S6904).

The flow is further advanced to step S6905, and the setting value of the setting item identified in step S6904 is corrected based on historical information. Upon the processing in step S6905 ending, the flow is again returned to step S6902, and similar processing is performed for all of the changing historical information.

In the case determination is made with the determination in step s6902 that all of the historical information has been reflected, this means that the processing relating to all historical information entries are completed, whereby the flow is advanced to step S6906, and the reply JDF is created based on the correction results in S6905.

Thus, according to the present embodiment, the setting value used in printing processing with the executing unit, which is not included in the print job, is stored, and by reprinting using such information, for example the output article mode from the previous printing and the output article mode from the reprinting can be the same.

Figure 27:
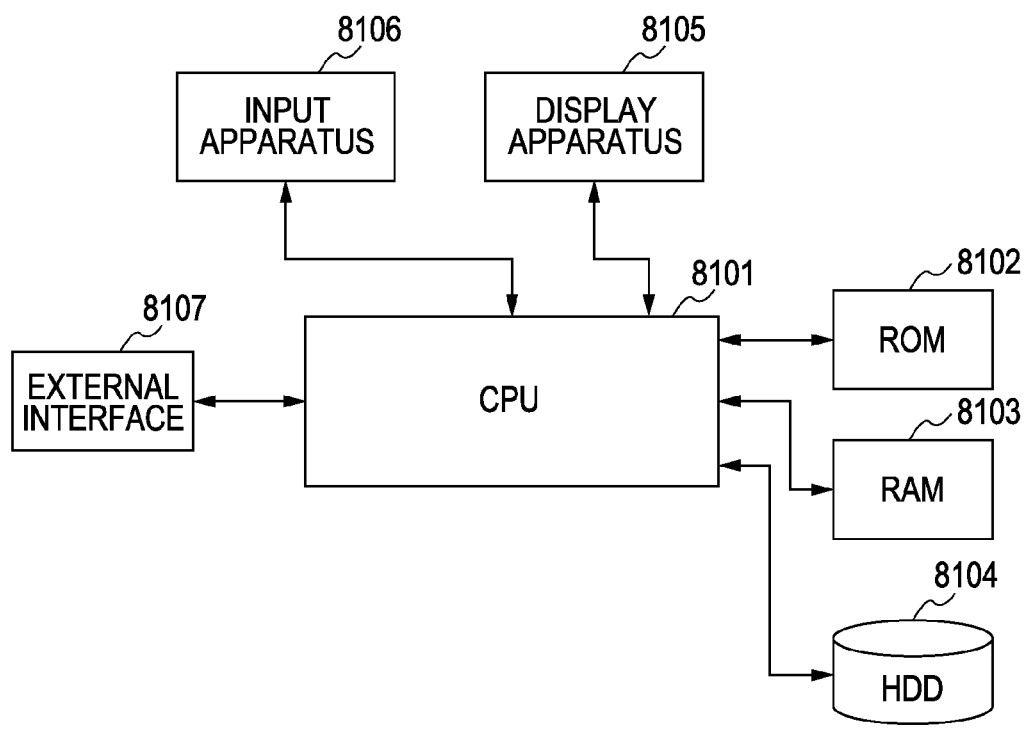
FIG. 27 is a diagram describing a configuration example of a PC.

FIG. 27 is a block diagram showing the internal configuration of the PC 104 in FIG. 1. The PC 104 stores programs to execute various types of processing and the data used by such programs in a hard disk 3104 (hereafter also called HD). The hard disk 3109 has JDF job data created with the PC 104 and JDF job data restored from the printing system 1000 stored therein.

Also, the PC 104 has an external interface 8107 to exchange various types of data with network connection apparatuses and external dedicated apparatuses. The PC 104 further has an input apparatus 8106 and display apparatus 8105. The input apparatus 8106 indicates an apparatus for inputting operation information such as a keyboard or mouse, for example, and the display apparatus 8105 indicates an apparatus for displaying such as a display.

The CPU 8101 performs overall control of the processing and operations of the various types of units of the PC 104. The ROM 8102 has various types of control programs necessary for the present embodiment stored therein including a program to execute the various types of processing in the later-described flowchart. Also, the ROM 8102 has a control program for display and operation of various types of user interface screens using the input apparatus 8106 and display apparatus 8105. The CPU 8101 reads and executes the program in the ROM 8102, thereby executing various types of operations described in the present embodiment with printing apparatus.

The RAM 8103 is readable/writable memory, and stores image data that is exchanged between the various types of modules shown in FIG. 27 and subjected to various types of processes, and various types of programs and setting information.

Figure 28:
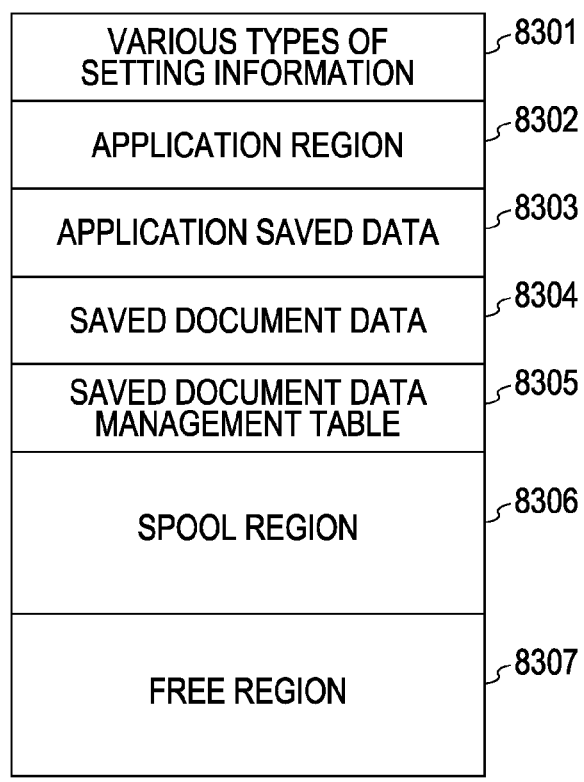
FIG. 28 is a diagram describing various types of data stored in hard disk drive of the PC.

FIG. 28 shows an example of the storage state of the various types of data that is stored in the hard disk 8104 in FIG. 27 and read from or written by the CPU 8101 in the PC 104.

A various setting information 8301 is a region for the PC 104 to hold the setting information and the like having properties that can be held permanently while performing various types of operations and that are also changeable.

An application region 8302 is a storage region for various types of application programs that are installed in the PC 104 and that are operated with the PC. The applications stored in the application region 8302 include applications for JDF job generating, transmitting, reply JDF receiving, and management of a JDF job saved in the PC.

An application saved data 8303 is setting data unique to the application stored in the application region 8302 and various types of saved data created by the application.

Details of the data stored in the application region 8302 and application saved data 8303 are not the primary topic for describing the present embodiment, therefore these will be omitted.

A saved document data region 8304 is a region that saves JDF job data created and edited in the PC 104. Also, in the case that the reply JDF shown in the first embodiment is sent from the printing system 1000, the PC 104 stores the reply JDF in the region 8304.

A saved document data management table 8305 is a region to store management information wherein JDF job data stored in the saved document data region 8304 is temporarily managed. The information stored in the region herein is described later with reference to FIG. 29.

A spool region 8306 is a region used as a buffer for temporarily holding printing data, in the event that the PC 104 transmits JDF job data to the printing system 1000, until the transmission processing is completed.

A free region 8307 is equivalent to a region in the hard disk 8104 other than the regions described above. The capacity of the region changes moment-by-moment according to the progress state of the processing with the PC 104, and depending on the usage load of the hard disk 8104, there may be cases wherein the free region 8307 is depleted and disappears.

Figure 29:
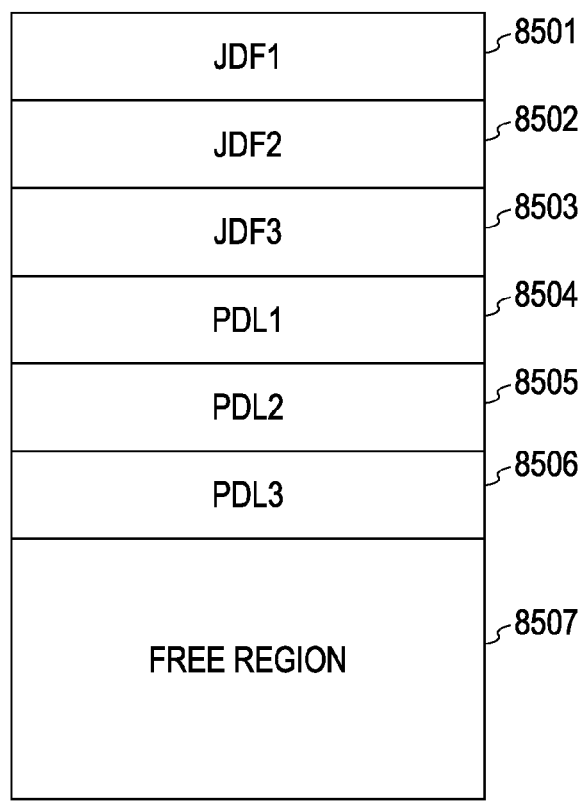
FIG. 29 is a diagram describing a storage data example within a saved document data region.

FIG. 29 shows an example of a configuration of the data stored in the saved document data region 8304 in FIG. 28 (8501-8507). The saved document data region 8304 has job ticket data, and PDL data for rendering printing content, stored therein. Correlation of the job ticket data and PDL data is performed with the saved document data management table 8305 in FIG. 28.

FIG. 30 shows an example of data configuration stored in the saved document management table 8305 in FIG. 28. The saved document management table 8305 is made up of three fields.

A job ID field 8701 is a field to manage IDs for uniquely identifying the JDF jobs stored in the saved document data region 8304. The ID is used for internal control, and is also used to uniquely identify the jobs issued from an apparatus in a workflow. Also, the actual ID is expressed and managed according to a format that can satisfy the above-described conditions. A JDF field 8702 is a field to identify the job ticket corresponding with the job identified with the job ID field 8701. A PDL field 8703 is a field to identify the PDL data corresponding to the job identified with the job ID field 8701. In the example shown in the diagram, only single PDL data is corresponded, but depending on the JDF job, multiple PDL files can be corresponded to a single JDF job. In this case multiple PDL files are listed in the field thereof.

Figure 31:
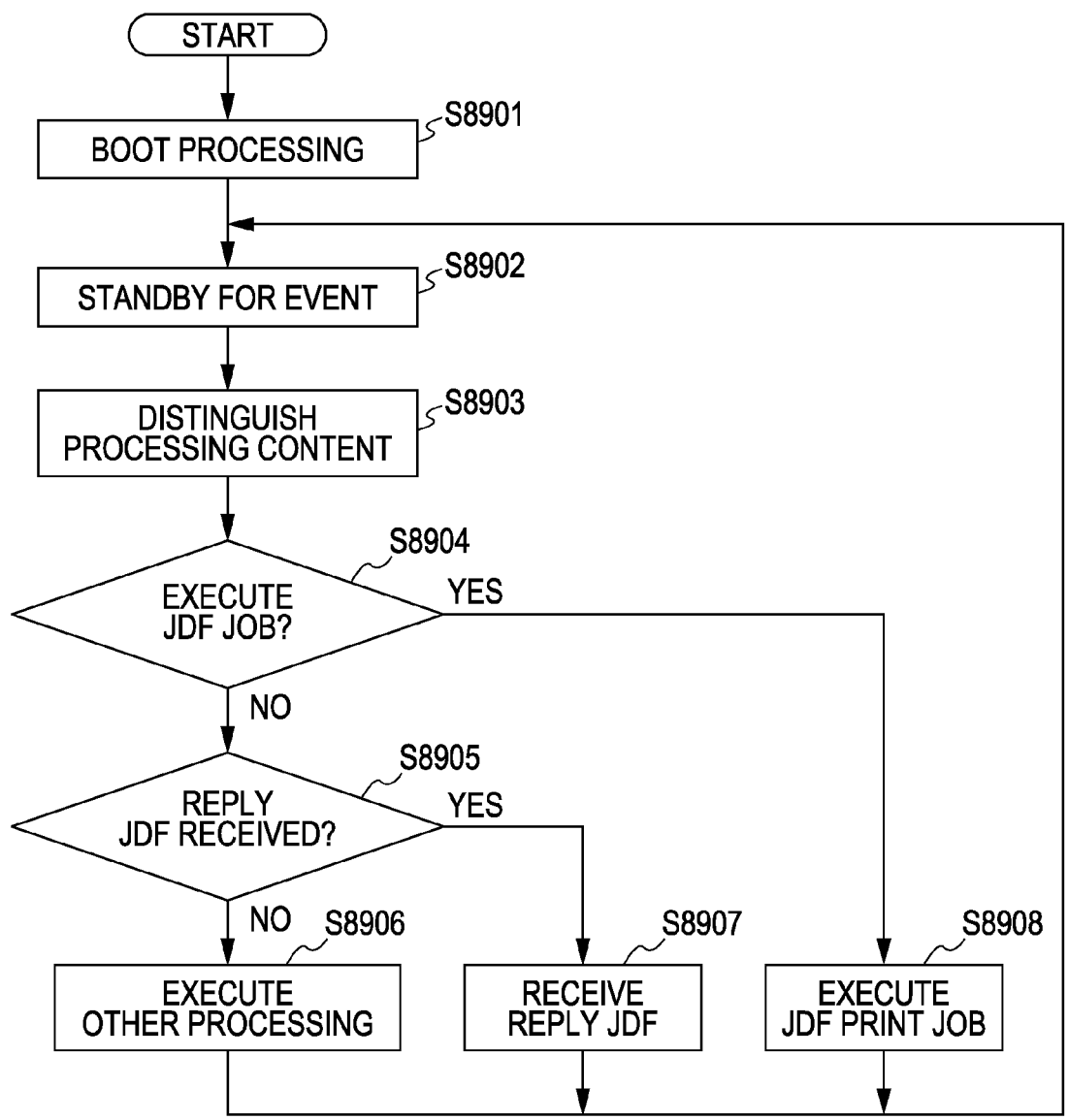
FIG. 31 is a flowchart executed by the PC.
Figure 32:
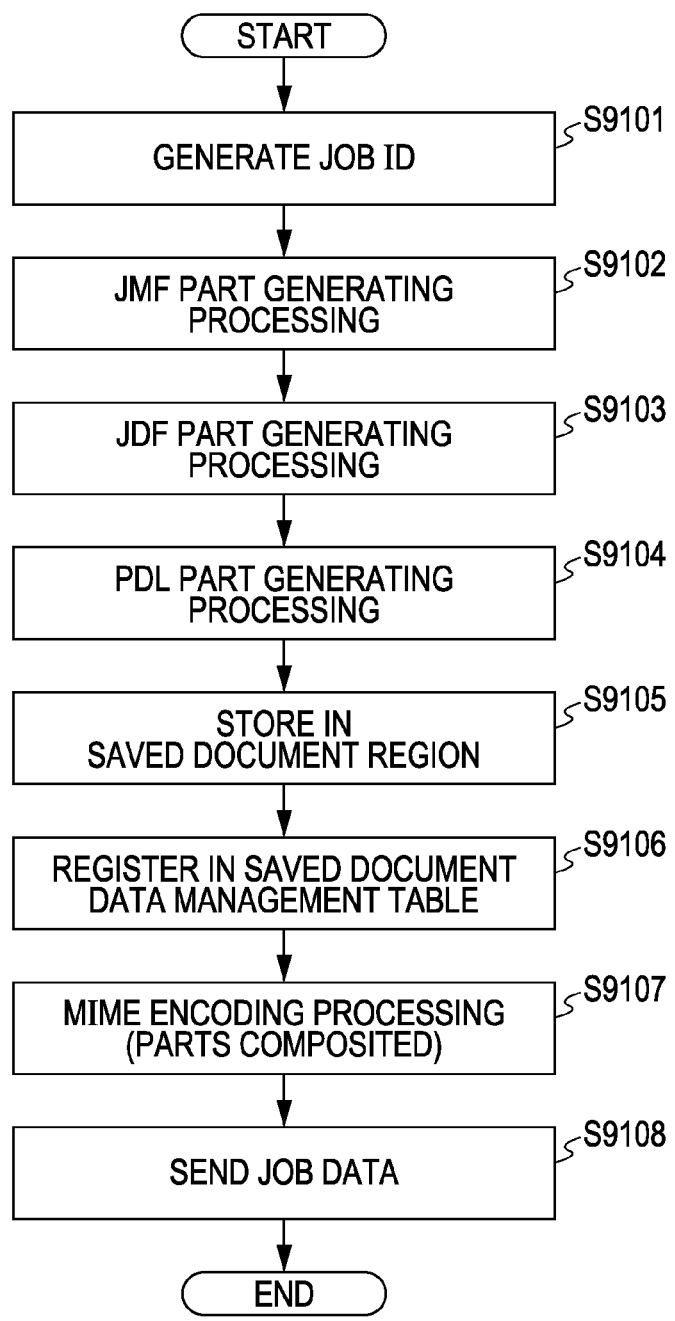
FIG. 32 is a flowchart executed by the PC.
Figure 33:
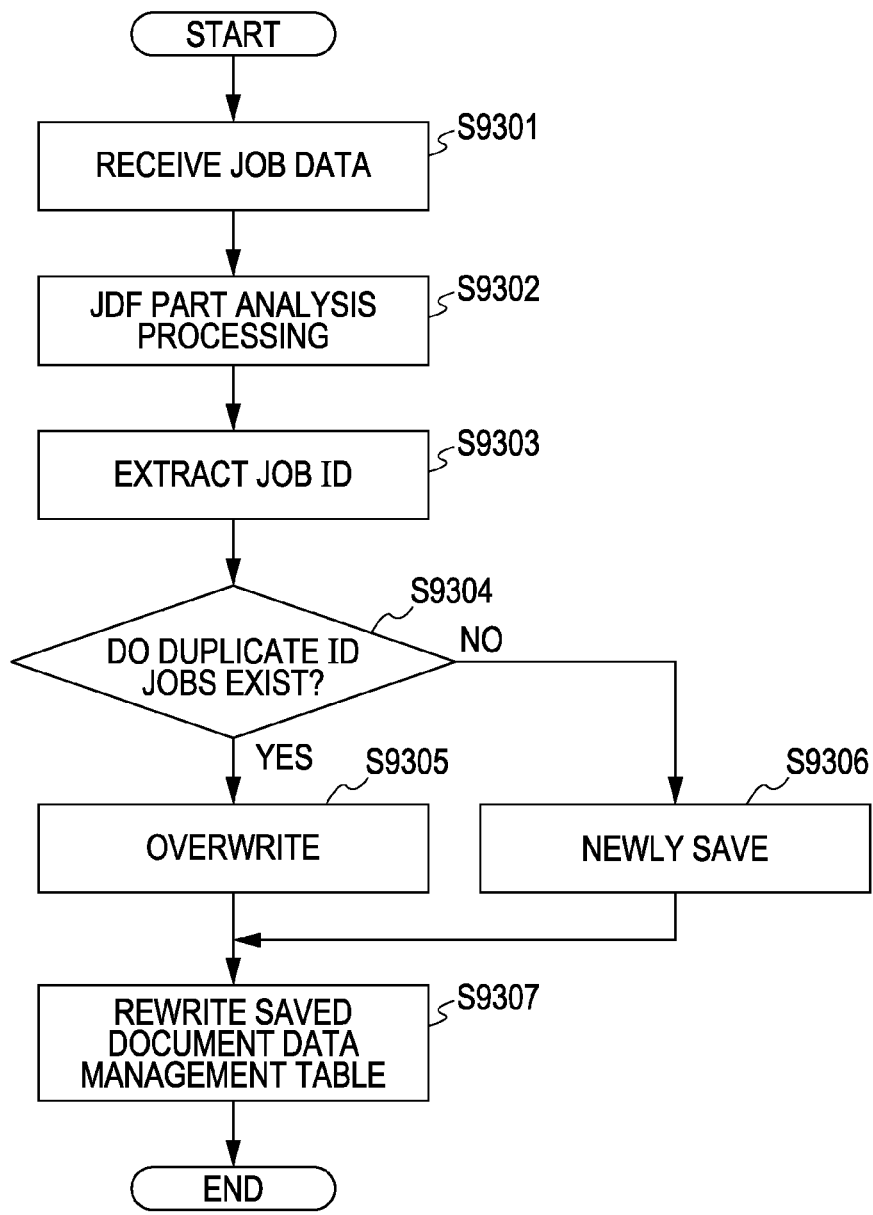
FIG. 33 is a flowchart executed by the PC.

FIG. 31 describes the processing flow relating to control after the PC 104 startup performed by the CPU unit 8101 in FIG. 27. Note that FIGS. 31 through 33 show processing executed with a host computer, whereby each processing step is executed with the CPU unit 8101.

First, the CPU unit 8101 executes boot processing upon the power being turned on (step S8901). Specifically, this is equivalent to processing to read and execute basic program groups necessary at the time of system startup in the RAM 8103 which are stored in the ROM 8102 and hard disk 8104 shown in FIG. 27.

Upon the ending of step S8901, the preparation for the PC 104 to function is completed, and moves into an event standby state in step S8902.

The event indicated here includes at least the following types of processing. A first event is various types of operations by a user via an input apparatus 8106. A second event is data exchange processing from various types of apparatuses external to the PC 104 via the external interface 8107. A third event a JDF job issue request. Also, a fourth event is reply JDF receiving processing as to the PC 104 from an apparatus external to the PC 104. Further, a fifth event indicates events that serve as a cause for the PC 104 to transition from the idle state, such as various types of incidents that occur in the PC 104. In other words, as long as no event occurs, the CPU 8101 that provides overall control of the PC 104 does not move from step S8902.

In the case that the CPU unit 8101 detects in step S8902 that an event has occurred, the type of event occurring in S8903 is determined. In S8904, the CPU unit 8101 determines whether the event occurring in S8902 is a JDF job issue request. As a result of the determination in step S8904, in the case that the occurred event is a JDF job issue request, the CPU unit 8101 generates a JDF job in step S8908, and transmits the JDF print job from the PC 104 to the printing system 1000 via the external interface 202. Details of the operations in this step will be described later.

As a result of determination in step S8904, in the case determination is made that the occurred event is not a JDF job issue request, the CPU unit 8101 determines whether processing to receive a reply JDF has occurred (S8905). In the case the occurred event is a reply JDF receiving processing, the CPU 8101 unit receives the reply JDF in step S8907. The reply JDF indicates a JDF wherein the setting items and setting values held in the job ticket are converted to assure output article form matching when the output article form matching mode described in the first embodiment of the present invention is valid.

As a result of the determination in step S8905, in the case determination is made that the event is not reply JDF receiving processing, the CPU unit 8101 executes processing according to the occurred event type (S8906).

FIG. 32 is a flowchart to describe the details in step S8910 in FIG. 31 (JDF print job issue processing). First, the CPU unit 8101 generates a job ID (step S9101). Next, the CPU unit 8101 creates a JMF part (step S9102). The JMF itself provides necessary work such as managing the communication and state while controlling the JDF workflow system. However, this is not important for describing the present embodiment, therefore a detailed description thereof will be omitted.

In step S9103, the CPU unit 8101 generates a JDF part. In step S9104, the CPU unit 8101 generates PDL data which is data to be printed. The PDL data is presumed to have been generated by the above-described printing job generating application.

In step S9105, the CPU unit 8101 stores the JDF part and PDL data created in steps S9103 and S9104 in the saved document data region 8304.

In step S9106, the CPU unit 8101 correlates the JDF part and PDL data registered in step S9105 with the job ID issued in step S9101 and registers this in the saved document data management table 8305.

All of the information making up the JDF job to be transmitted to the printing system 1000 has been generated at the stage of up to step S9106. Next, the flow is advanced to step S9107, and the CPU unit 8101 encodes the data making up the print job, i.e. the various parts generated in steps S9102, S9103, and S9104 with MIME to transmit to the printing system, and converts this into a single data block.

In step S9108, the CPU unit 8101 sends the data already MIME-encoded that is created in step S9107 to the printing system 1000 and ends the processing.

FIG. 33 describes the detailed flow of step S8909 in FIG. 31 (reply JDF receiving processing). The CPU unit 8181 receives the job data transmitted from the printing system 1000 (step S9301). The job data received here is reply JDF replied from the printing system. That is to say, the JDF herein is equivalent to the JDF shown in FIG. 21 in the previous embodiment, and is equivalent to the JDF created in step S6309 and replied in step S6310 in FIG. 23.

Next, in step S9302, the CPU unit 8101 analyzes the JDF received in step S9301. The job ID is extracted in step S9302 according to the analysis processing in S9302, and in step S9304, the CPU unit 8101 determines whether or not the job corresponding to the job received in step S9301 is stored in the saved document management table 8305, based on the extracted job ID.

As a result of the determination in step S9304, in the case determination is made that a job having the same job ID as the job ID of the reply JDF is already stored in the saved document management table 8305, the flow is advanced to step S9305. That is to say, the already-existing JDF in the saved document data region 8304 having the same ID is replaced with the received reply JDF. The replacement processing herein is equivalent to updating the JDF before processing with the JDF subjected to processing for assuring the output article form matching on the printing system 1000 side. The JDF replaced with the update herein can assure output article form matching as described above. Accordingly, in the case of transmitting a reprinting job for the same job, the replaced JDF (reply JDF) is input into the print system 1000 again, whereby the output article having the same form as generated before can be generated.

As a result of the determination in step S9304, in the case that a job having the same job ID as the job ID of the reply JDF is not stored in the saved document management table 8305, this means that the reply JDF is a new job. In this case, the flow is advanced to step S9306 and added to the saved document data region 8304 as a new job.

Upon the processing in steps S9305 and S9306 completing, the flow is advanced to step S9307, the content in the saved document data management table is changed according to the processing content in steps S9305 and S9306, and the processing is ended.

Note that as a reprinting form, a printing job including the reply JDF and PDL data may be correlated with an identifying number of the print job and stored, whereby a client may reprint a print job corresponding to the identifying number by notifying only the identifying number from a host computer. In this case, the controller unit 205 correlates the reply JDF and identifying number of the job in step S6310 in FIG. 23 and stores this, and transmits the identifying number to the host computer.

Note that whether the output article form matching mode used on the printing system 1000 side is executable or not is described in the example specifying the output article form matching mode using the operating panel of the print system 1000.

However, the settings of the output article form matching mode may be in a form to perform from the PC 104 side which is the job issuing origin.

In this case, an arrangement may be made wherein the valid/invalid instructions of the output article form matching mode is included in the job tickets as a way to perform instructions from the PC 104 side. That is to say, the printing system 1000 receives a job ticket including the valid/invalid instructions of the output article form matching mode and performs analysis processing. In this case, the instruction information indicating whether or not an output article form matching mode is described in the job ticket. An arrangement may be made wherein the printing system switches processing according to the instructions of whether or not to execute the output article form matching mode.

On the other hand, an output article having the same output form as the previous time can be obtained by executing the output article form matching mode. However, fixing the setting values for output article form matching may result in not being able to execute reprinting.

For example, with the job ticket of the first printing, the setting item for sheet is set as "cassette 1", whereby the printing system 1000 uses the "A4/normal paper" set in the cassette 1 to print. In this event, the setting item of the sheet is changed in the reply JDF from "cassette 1" to "A4/normal paper".

In the case of reprinting using the reply JDF, "A4/normal paper" is used. However, "A4/normal paper" is insufficient while "A4/reprinting paper" is remaining, and by using the first JDF, by supplementing the cassette 1 with "A4/reprinting paper", the output article forms do not match but printing can be executed. That is to say, fixing the setting values for output article form matching may have resulted in not being able to respond in a flexible manner.

Thus, with the present embodiment, the setting items changed in order to realize output article form matching has the setting values before changing and the setting values after changing described therein. As a result, in the case of determining that printing cannot be performed with the setting values after changing (e.g. A4/normal paper"), the printing system determines to process using the setting values stored in the setting items relating to sheets (e.g. cassette 1).

As a result, in the above example, by supplementing "A4/reprinting paper" in the cassette 1, even if determination is made that this differs from A4/normal paper, printing using the "A4/reprinting paper" can be performed. Accordingly, printing processing can be executed using the JDF setting values before changing in an identified case (e.g. paper has run out), while matching the output article form as much as possible, whereby efficiency can also be improved.

According to the present invention, an output article desired by the client can be output with reprinting also. Note that the present invention may be applied to a system made up of multiple apparatuses (e.g. host computer, interface apparatus, reader, printer, etc) or may be applied to an apparatus made up of one device (e.g. copier, facsimile apparatus, etc).

With the present invention, a computer-readable storage medium having recorded therein a program code to realize the functions of the embodiments as described above is supplied to a system or apparatus, whereby a computer of the system or apparatus thereof executes the program code stored in the computer-readable storage medium. In this case, the program code itself that is read from the computer-readable storage medium realizes the functions of the embodiments described above, and the computer-readable storage medium storing such program code makes up the present invention. Also, there may be cases wherein the operating system (OS) running on the computer performs part or all of the actual processing, based on instructions from the program code read out by the computer, whereby the functions of the embodiments described above are realized. Naturally, the functions thereof may be realized with a program readable by an information processing apparatus of the present Specification.

Further, there may be cases wherein, upon the program code read out from the computer-readable storage medium being written into the memory, the CPU or the like performs part or all of the actual processing based on instruction from the program code thereof and the functions of the embodiment described above are realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-111515 filed Apr. 22, 2008, which is hereby incorporated by reference herein in its entirety.

What is claimed is:

1. An image forming apparatus comprising a sheet supply unit to store a sheet, comprising:
   a receiving unit configured to receive a print job including print setting information and rendering data;
   an executing unit configured to execute, when the sheet supply unit is set as a setting value of a sheet included in the print setting information, printing processing using the sheet stored in the sheet supply unit;
   a setting unit configured to set an output article form matching function such that a printed material output in the printing processing by the executing unit and a printed material output in reprinting processing by the executing unit have a matched output form;
   a changing unit configured to change the setting value of the sheet from the sheet supply unit to a type of sheet used by the printing processing after the executing unit executes the printing processing, when the output article form matching function is set; and
   a generating unit configured to generate the print setting information including the type of sheet changed by the changing unit,
   wherein reprinting processing is executed using the print setting information including the type of sheet changed by the changing unit.

2. The image forming apparatus according to claim 1, further comprising:
   a transmitting unit configured to transmit the print setting information generated by the generating unit.

3. An image forming method comprising:
   receiving a print job including print setting information and rendering data;
   executing, when a sheet supply unit is set as a setting value of a sheet included in the print setting information, printing processing using the sheet stored in the sheet supply unit;
   setting an output article form matching function such that a printed material output in the printing processing and a printed material output in reprinting processing have a matched output form;
   changing the setting value of the sheet from the sheet supply unit to a type of sheet used by the printing processing after the executing the printing processing, when the output article form matching function is set; and
   generating the print setting information including the type of sheet changed in the changing step,
   wherein reprinting processing is executed using the print setting information including the type of sheet changed in the changing step.

4. The control method according to claim 3, further comprising:
   transmitting the print setting information generated in the generating step.

5. A non-transitory computer-readable storage medium storing a control program to be executed with an image forming apparatus, such that the image forming apparatus executes the steps of:
   receiving a print job including print setting information and rendering data;
   executing, when a sheet supply unit is set as a setting value of a sheet included in the print setting information, printing processing using the sheet stored in the sheet supply unit;
   setting an output article form matching function such that a printed material output in the printing processing and a printed material output in reprinting processing have a matched output form;
   changing the setting value of the sheet from the sheet supply unit to a type of sheet used by the printing processing after the executing the printing processing, when the output article form matching function is set; and
   generating the print setting information including the type of sheet changed in the changing step,
   wherein reprinting processing is executed using the print setting information including the type of sheet changed in the changing step.

* * * * *